US011940095B2

(12) United States Patent
Gass et al.

(10) Patent No.: US 11,940,095 B2
(45) Date of Patent: Mar. 26, 2024

(54) DETECTION SYSTEMS FOR POWER TOOLS WITH ACTIVE INJURY MITIGATION TECHNOLOGY

(71) Applicant: SawStop Holding LLC, Tualatin, OR (US)

(72) Inventors: Stephen F. Gass, West Linn, OR (US); John P. Nenadic, Camas, WA (US); Louis R. Slamka, Vancouver, WA (US)

(73) Assignee: SawStop Holding LLC, Tualatin, OR (US)

( * ) Notice: Subject to any disclaimer, the term of this patent is extended or adjusted under 35 U.S.C. 154(b) by 146 days.

(21) Appl. No.: 17/407,433

(22) Filed: Aug. 20, 2021

(65) Prior Publication Data
US 2022/0042648 A1   Feb. 10, 2022

Related U.S. Application Data

(63) Continuation of application No. 16/304,539, filed as application No. PCT/US2017/034566 on May 25, 2017, now Pat. No. 11,098,849.
(Continued)

(51) Int. Cl.
*F16P 3/14* (2006.01)
*B26D 7/22* (2006.01)
(Continued)

(52) U.S. Cl.
CPC .............. *F16P 3/148* (2013.01); *B26D 7/22* (2013.01); *B32B 9/00* (2013.01); *H01R 39/64* (2013.01);
(Continued)

(58) Field of Classification Search
CPC .... B26D 7/22; B32B 9/00; F16P 3/148; F16P 3/12; B27G 19/00; B23D 47/12; H01R 39/64; H01R 39/20
(Continued)

(56) References Cited

U.S. PATENT DOCUMENTS 1,551,900 A   9/1925   Morrow
1,584,086 A   5/1926   Fonda
(Continued)

FOREIGN PATENT DOCUMENTS

CA   2140991   1/1995
DE   76186    8/1921
(Continued)

OTHER PUBLICATIONS

Skil Model 3400-Type 1 10" Table Saw Parts List and Technical Bulletin, S-B Power Tool Company, Jun. 1993.
(Continued)

*Primary Examiner* — Ghassem Alie

(57) ABSTRACT

Power tools with conductive couplings used with active injury mitigation technology are disclosed. Conductive couplings are particularly relevant to table saws, hand-held circular saws, track saws, miter saws, and band saws with active injury mitigation technology. Conductive couplings provide a mechanism through which an electrical signal can be coupled or imparted to a blade, and then monitored for changes indicative of human contact with the blade. An exemplary conductive coupling includes a brush that establishes an electrical connection with a moving part of a power tool, and the brush maintains contact with the moving part of the power tool during at least 40 hours of cumulative time when the motor is spinning the arbor and blade without an interruption in the electrical connection sufficient to trigger the reaction system. A conductive coupling may be two-sided compliant. A conductive coupling may connect to a motor shaft to minimize electrical noise.

8 Claims, 20 Drawing Sheets

Related U.S. Application Data

(60) Provisional application No. 62/343,451, filed on May 31, 2016.

(51) Int. Cl.
  *B32B 9/00* (2006.01)
  *H01R 39/64* (2006.01)
  *B23D 47/12* (2006.01)
  *B27G 19/00* (2006.01)
  *H01R 39/20* (2006.01)

(52) U.S. Cl.
  CPC .............. *B23D 47/12* (2013.01); *B27G 19/00* (2013.01); *H01R 39/20* (2013.01)

(58) Field of Classification Search
  USPC ... 83/62.1, 58, 74, DIG. 1, 490, 76.1, 477.1, 83/76.7, 477.2; 30/388, 276, 277, 4; 324/678, 658, 686, 660, 425, 706, 60 C, 324/61 R, 71 R
  See application file for complete search history.

(56) References Cited

U.S. PATENT DOCUMENTS

| | | | |
|---|---|---|---|
| 2,434,174 A | | 1/1948 | Morgan |
| 2,722,249 A | * | 11/1955 | Jinks ..................... B27C 5/06 83/869 |
| 2,785,710 A | | 3/1957 | Mowery, Jr. |
| 3,274,876 A | | 9/1966 | Debus |
| 3,456,696 A | | 7/1969 | Gregory et al. |
| 3,538,964 A | | 11/1970 | Warrick et al. |
| 3,785,230 A | | 1/1974 | Lokey |
| 3,858,095 A | | 12/1974 | Friemann et al. |
| 3,905,263 A | | 9/1975 | Smith |
| 4,117,752 A | | 10/1978 | Yoneda |
| 4,199,930 A | | 4/1980 | Lebet et al. |
| 4,453,112 A | | 6/1984 | Sauer-et al. |
| 4,468,069 A | | 8/1984 | Meal et al. |
| 4,503,739 A | | 3/1985 | Konieczka |
| 4,512,224 A | | 4/1985 | Terauchi |
| 4,637,289 A | | 1/1987 | Ramsden |
| 4,653,189 A | | 3/1987 | Andreasson |
| 4,694,721 A | | 9/1987 | Brickner, Jr. |
| 4,801,270 A | * | 1/1989 | Scarlata ................ F16C 41/002 439/95 |
| 4,965,909 A | | 10/1990 | McCullough et al. |
| 5,052,255 A | | 10/1991 | Gaines |
| 5,081,406 A | | 1/1992 | Hughes et al. |
| 5,083,973 A | | 1/1992 | Townsend |
| 5,122,091 A | | 6/1992 | Townsend |
| 5,272,946 A | | 12/1993 | McCullough et al. |
| 5,377,554 A | | 1/1995 | Reulein et al. |
| 5,422,551 A | | 6/1995 | Takeda et al. |
| 5,510,685 A | | 4/1996 | Grasselli |
| 5,804,316 A | | 9/1998 | Suggs et al. |
| 5,942,975 A | | 8/1999 | Sorensen |
| 6,224,396 B1 | | 5/2001 | Chan et al. |
| 6,295,910 B1 | | 10/2001 | Childs et al. |
| 6,316,846 B1 | | 11/2001 | Kashiwazaki et al. |
| 6,418,829 B1 | | 7/2002 | Pilchowski |
| 6,617,720 B1 | | 9/2003 | Egan, III et al. |
| 6,900,728 B2 | | 5/2005 | Metzger, Jr. |
| 6,922,153 B2 | | 7/2005 | Pierga et al. |
| 6,959,631 B2 | | 11/2005 | Sako |
| 7,009,552 B2 | | 3/2006 | Sako |
| 7,047,854 B2 | | 5/2006 | Sako |
| 7,084,779 B2 | | 8/2006 | Uneyama |
| 7,121,839 B2 | | 10/2006 | Rathburn |
| 7,173,537 B2 | | 2/2007 | Voigtlaender |
| 7,373,863 B2 | | 5/2008 | O'Banion et al. |
| 7,421,932 B1 | | 9/2008 | Heinzmann et al. |
| 7,644,645 B2 | | 1/2010 | Gass et al. |
| 7,722,786 B2 | | 5/2010 | Bao et al. |
| 8,413,559 B2 | | 4/2013 | Gass |
| 2001/0032534 A1 | | 10/2001 | Ceroll et al. |
| 2002/0170400 A1 | * | 11/2002 | Gass ..................... B27G 21/00 83/788 |
| 2004/0060404 A1 | | 4/2004 | Metzger, Jr. |
| 2004/0123709 A1 | | 7/2004 | Metzger, Jr. |
| 2004/0159198 A1 | | 8/2004 | Peot et al. |
| 2004/0194594 A1 | | 10/2004 | Dils et al. |
| 2004/0200329 A1 | | 10/2004 | Sako |
| 2004/0226424 A1 | | 11/2004 | O'Banion et al. |
| 2004/0226800 A1 | | 11/2004 | Pierga et al. |
| 2005/0057206 A1 | | 3/2005 | Uneyama |
| 2005/0145080 A1 | | 7/2005 | Voigtlaender |
| 2005/0268767 A1 | | 12/2005 | Pierga et al. |
| 2006/0096425 A1 | | 5/2006 | Keller |
| 2006/0101960 A1 | | 5/2006 | Smith et al. |
| 2008/0016998 A1 | | 1/2008 | Keller |
| 2008/0173147 A1 | | 7/2008 | Kovarik et al. |
| 2008/0174320 A1 | | 7/2008 | Smith et al. |
| 2008/0196565 A1 | | 8/2008 | Eppard |
| 2008/0196991 A1 | | 8/2008 | Eppard |
| 2008/0200263 A1 | | 8/2008 | Eppard |
| 2014/0001916 A1 | | 1/2014 | Berard |
| 2015/0256054 A1 | * | 9/2015 | Northwall .............. H02K 11/40 310/68 C |
| 2016/0318190 A1 | | 11/2016 | Prahlad et al. |

FOREIGN PATENT DOCUMENTS

| | | |
|---|---|---|
| DE | 2917497 | 4/1979 |
| DE | 3427733 | 1/1986 |
| DE | 4221479 | 1/1994 |
| DE | 4326313 | 2/1995 |
| DE | 19609771 | 6/1998 |
| DE | 20102704 | 2/2001 |
| EP | 0362937 | 4/1990 |
| GB | 1132708 | 11/1968 |
| GB | 2096844 | 10/1982 |
| GB | 2142571 | 1/1985 |
| WO | WO 03/006213 | 1/2003 |

OTHER PUBLICATIONS

Shop Fox® Fence Operating Manual, Woodstock International, Inc., 1996, revised May 1997.
Analog Devices, Inc., 3-Axis Capacitive Sensor—Preliminary Technical Data AD7103, pp. 1-40, © 1998.
U.S. Appl. No. 60/157,340, filed Oct. 1, 1999, entitled "Fast-Acting Safety Stop."
U.S. Appl. No. 60/182,866, filed Feb. 16, 2000, entitled "Fast-Acting Safety Stop."
IWF 2000 Challengers Award Official Entry Form, submitted Apr. 26, 2000, 6 pages plus CD (the portions of U.S. patent applications referenced in the form are from U.S. Appl. No. 60/157,340, filed Oct. 1, 1999 and U.S. Appl. No. 60/182,866, filed Feb. 16, 2000).
Excaliber T-Slot Precision Saw Fence Model TT45 Owner's Manual, Sommerville Design & Manufacturing, Inc., May 2000.
Bosch Model 4000 Worksite Table Saw Operating/Safety Instructions, S-B Power Tool Company, Jul. 2000.
Two photographs of a saw displayed at a trade show on Aug. 23, 2000.
Xacta Fence II™ Homeshop 30/52 Owner's Manual, Jet Equipment & Tools, Mar. 2001.
Xacta Fence II™ Commercial 30/50 Owner's Manual, Jet Equipment & Tools, Mar. 2001.
Bosch 10" Table Saw Model 0601476139 Parts List and Technical Bulletin, S-B Power Tool Company, Apr. 2001.
Biesemeyer® T-Square® Universal Home Shop Fence system Instruction Manual, Delta Machinery, Jun. 1, 2001.
Powermatic 10" Tilting Arbor Saw Model 66 Instruction Manual & Parts List, Jet Equipment & Tools, Jun. 2001.
Tablesaw Splitters and Blade Covers, Fine Woodworking, pp. 77-81, Dec. 2001.
Young Inventor: Teen's Device Earns Her Trip to Science Fair, The Arizona Republic, May 5, 2006.

(56) References Cited

OTHER PUBLICATIONS

Operator Injury Mitigation Using Electronic Sensing and Mechanical Braking and Decoupling Devices in Handheld Circular Saws, Erin F. Eppard, date unknown.
Skil Model 3400 Table Saw Operating/Safety Instructions, S-B Power Tool Company, Sep. 2001.
The Merlin Splitter by Excalibur a Sommerville Design Product Overview & Generic Installation Notes, Sommerville Design & Manufacturing Inc., at least as early as 2002.
Incra Incremental Micro Precision Table Saw Fence Owner's Manual, Taylor Design Group, Inc., 2003.
Shop Fox® Models W2005, W2006, W2007 Classic Fence Instruction Manual, Woodstock International, Jan. 2000, revised Mar. 2004.
Accu-Fence® 64A Fence and Rail System Owner's Manual, WMH Tool Group, Sep. 2004.
Unifence™ Saw Guide Instruction Manual, Delta Machinery, Feb. 22, 2005.
Biesemeyer® T-Square® Commercial Fence System Instruction Manual, Delta Machinery, May 2, 2005.
Laguna Tools table saw owner's manual, date unknown.
*You Should Have Invented It*, French television show video.
*Helwig Carbon—The Bearing Protector*, Helwig Carbon Products, Inc., date unknown (possibly 2012).

\* cited by examiner

DETECTION SYSTEMS FOR POWER TOOLS WITH ACTIVE INJURY MITIGATION TECHNOLOGY

CROSS-REFERENCE TO RELATED APPLICATION

This application is a continuation of U.S. patent application Ser. No. 16/304,539, filed Nov. 26, 2018, which is a continuation of International Application No. PCT/US2017/034566, filed May 25, 2017, which claims the benefit of and priority from U.S. Provisional Patent Application Ser. No. 62/343,451, filed May 31, 2016, all of which are incorporated herein by reference.

FIELD

The present disclosure relates to power tools, and more particularly, to conductive couplings used in power tools equipped with active injury mitigation technology. Conductive couplings are particularly relevant to table saws, hand-held circular saws, track saws, miter saws, and band saws with active injury mitigation technology. Conductive couplings provide a mechanism through which an electrical signal can be coupled or imparted to a blade, and then monitored for changes indicative of human contact with the blade.

BACKGROUND

A power tool such as a table saw, hand-held circular saw, track saw, miter saw, or band saw is used to cut a workpiece, such as a piece of wood, to a desired size or shape. A table saw includes a work surface or table and a circular blade extending up through the table. A person uses a table saw by placing a workpiece on the table and feeding it into contact with the spinning blade to cut the workpiece to a desired size. A hand-held circular saw includes a circular blade, motor and handle. A person uses a hand-held circular saw by grasping the handle and moving the spinning blade into contact with a workpiece. A track saw is similar to a hand-held circular saw, and includes a track to guide the movement of the saw as the blade cuts the workpiece. A miter saw includes a circular blade on a moveable support arm. A person uses a miter saw by placing a workpiece under the blade and then moving the blade into contact with the workpiece to make a cut, typically by pivoting the blade and support arm down. A band saw includes a work surface and an adjacent band blade driven around two or more rollers or wheels. A person uses a band saw by placing a workpiece on the work surface and moving the workpiece into contact with the band blade.

Power tools such as these are some of the most basic and versatile machines used in woodworking and construction. For example, they are used in making furniture and cabinetry, in the installation of hardwood flooring, in cutting plywood panels for roofing and walls, in cutting material for countertops, in making pallets and crates, and for many other projects and tasks.

Power tools such as table saws, hand-held circular saws, track saws, miter saws, and band saws come in various sizes and configurations. For example, table saws come in sizes ranging from large, stationary, industrial table saws, to small, lightweight, portable table saws. Larger table saws are sometimes called cabinet saws, mid-sized table saws are sometimes called contractor saws or hybrid saws, and smaller table saws are sometimes called portable, jobsite, or benchtop table saws. The larger table saws include induction motors and cast-iron parts, and typically weigh well over 100 pounds. The smaller, portable table saws are often small and light enough to be transported in the back of a pickup truck, and they often have stands with wheels so they can be moved around a jobsite or workspace. The smaller table saws have universal motors and weigh less than 100 pounds. For example, jobsite saws weigh approximately 60 to 80 pounds, and the smallest benchtop saws weigh approximately 40 to 45 pounds. Hand-held circular saws, track saws, miter saws and band saws also come in various sizes and configurations, and they can be equipped with different features.

The names "table saws," "hand-held circular saws," "track saws," "miter saws," and "band saws" are general categories that can overlap. For example, a track saw is a type of hand-held circular saw and can be referred to as a hand-held circular saw. Miter saws and band saws have tables or work surfaces on which a workpiece is placed to make a cut, and in that regard are similar to a table saw. Nevertheless, the designations "table saws," "hand-held circular saws," "track saws," "miter saws," and "band saws" are generally understood by persons of ordinary skill in the art of woodworking and construction to identify different categories or types of power tools.

Power tools with moving blades, such as the saws identified above, present potential dangers or hazards because of the blade. Numerous accidents occur where a person using a power saw accidentally comes into contact with the moving blade. To address this issue, power saws can be equipped with active injury mitigation technology. Active injury mitigation technology detects a dangerous condition, such as accidental contact with the moving blade by a person, and then performs some action to mitigate injury, such as stopping and/or retracting the blade within milliseconds. Generally, an embodiment of active injury mitigation technology includes at least a detection system to detect the dangerous condition and a reaction system to perform the action to mitigate injury. The terms "detection system" and "reaction system" are used to identify known categories of structural components, and therefore, identify structure rather than function, just as the terms "actuator" and "sensor" identify known categories of structural components. For example, the term "detection system" is known to describe structural elements such as electronic circuitry to generate and monitor an electrical signal. The term "reaction system" is known to describe structural elements such as brake mechanisms and retraction mechanisms. U.S. patent application Ser. No. 10/100,211, filed Mar. 13, 2002 and titled "Safety Systems for Power Equipment," describes active injury mitigation technology and various implementations and embodiments of active injury mitigation technology in power saws. The entire disclosure of U.S. patent application Ser. No. 10/100,211, and the patent resulting from that application, are incorporated herein by reference.

In a power tool having a moving blade and equipped with an embodiment of active injury mitigation technology, the blade can be used as a sensor to detect contact between a human and the blade. For example, U.S. Pat. No. 7,284,467, titled "Apparatus And Method for Detecting Dangerous Conditions In Power Equipment," which is incorporated herein by reference, discloses systems that impart an electrical signal to the blade, and monitor the signal for changes indicative of human contact.

One way in which an electrical signal can be imparted to the blade is through a capacitive coupling, and U.S. Pat. No. 7,284,467 describes embodiments of capacitive couplings.

For example, conductive plates can be positioned in close proximity to the blade to capacitively couple the blade to an electronic circuit, or conductive surfaces can be positioned in close proximity to the arbor or drive shaft of the blade to create a capacitive coupling with the arbor, which is conductively coupled to the blade. In these capacitive couplings there is no physical contact between the conductive elements (also called conductive plates) that form the capacitive couplings.

Another way to impart an electrical signal to the blade is through a conductive coupling. A conductive coupling may be referred to as a direct coupling because the electrical signal is transferred by means of direct, physical contact between conductors. To date, however, creating and maintaining a reliable, conductive coupling to a moving blade or spinning arbor has proved difficult.

This specification describes conductive couplings, and particularly, conductive couplings used to connect a circuit to a moving part of a power tool such as a spinning blade or arbor.

DETAILED DESCRIPTION

Figure 1:
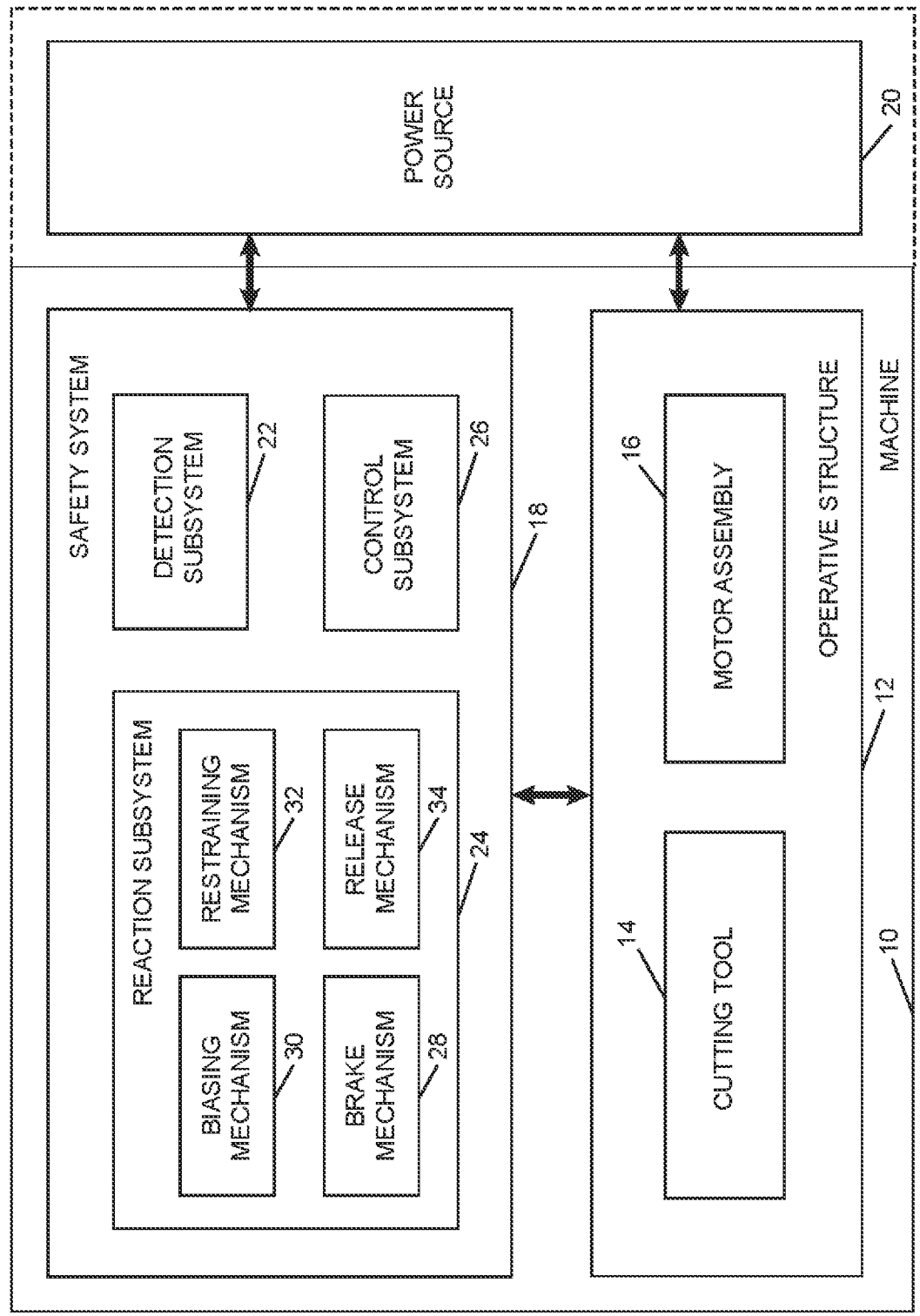
FIG. 1 is a schematic block diagram of a power tool with an embodiment of active injury mitigation technology.

A power tool with an embodiment of active injury mitigation technology that detects human contact with a designated portion of the power tool is shown schematically in FIG. 1 and indicated generally at 10. Power tool 10 includes an operative structure 12 having a working or cutting tool 14 and a motor assembly 16 adapted to drive the cutting tool. Power tool 10 also includes a safety system 18 configured to minimize the potential of a serious injury to a person using the tool. Safety system 18 is adapted to detect the occurrence of one or more dangerous conditions during use of the power tool, such as human contact with a moving cutting tool. If such a dangerous condition is detected, safety system 18 is adapted to engage operative structure 12 to limit any injury to the user caused by the dangerous condition.

Power tool 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of power tool 10.

It will be appreciated that operative structure 12 may take any one of many different forms. For example, operative structure 12 may include a stationary housing configured to support motor assembly 16 in driving engagement with cutting tool 14. As further examples, operative structure 12 may be part of a table saw, hand-held circular saw, track saw, miter saw, or band saw.

Motor assembly 16 includes at least one motor adapted to drive cutting tool 14. The motor may be either directly (through gears) or indirectly (through a belt and pulleys) coupled to the cutting tool. The particular form of cutting tool 14 will vary depending upon the various embodiments of power tool 10. For example, cutting tool 14 may be a single, circular rotating blade having a plurality of teeth disposed along the perimetrical edge of the blade. Alternatively, the cutting tool may be a plurality of circular blades, such as a dado blade or dado stack, or some other type of blade or working tool.

Safety system 18 includes a detection subsystem 22, a reaction subsystem 24 and a control subsystem 26. As stated, the terms "detection subsystem" and "reaction subsystem" are used herein to identify known categories of structural components, and therefore, identify structure rather than function. The term "control subsystem" is also used to identify a known category of structural components, and therefore, identifies structure rather than function. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of power tool 10. In addition, control subsystem 26 typically includes one or more instruments operable by a user to control the machine. The control subsystem is configured to control power tool 10 in response to the inputs it receives.

Detection subsystem 22 is configured to detect the dangerous condition that a portion of the user's body is in contact with a portion of cutting tool 14. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to the dangerous condition, reaction subsystem 24 is configured to engage operative structure 12 quickly to prevent serious injury to the user. It will be appreciated that the particular action to be taken by reaction subsystem 24 will vary depending on the type of power tool 10. For example, reaction subsystem 24 may be configured to do one or more of the following: stop the movement of cutting tool 14, or retract the cutting tool from its operating position. Retracting the cutting tool is described in more detail in the following patent applications and patents, all of which are herein incorporated by reference: U.S. Provisional patent application Ser. No. 14/884,324, entitled "Table Saws," filed Sep. 3, 2015 by SD3, LLC; U.S. patent application Ser. No. 10/100,211, titled "Safety Systems for Power Equipment," filed Mar. 13, 2002 by SD3, LLC, and the patent issuing from that application; and U.S. Pat. No. 7,098,800, entitled "Retraction System and Motor Position for Use With Safety Systems for Power Equipment," issued Aug. 29, 2006.

It will be appreciated by those of skill in the art that the exemplary embodiment depicted in FIG. 1 and described above may be implemented in a variety of ways depending on the type and configuration of operative structure 12.

Figure 2:
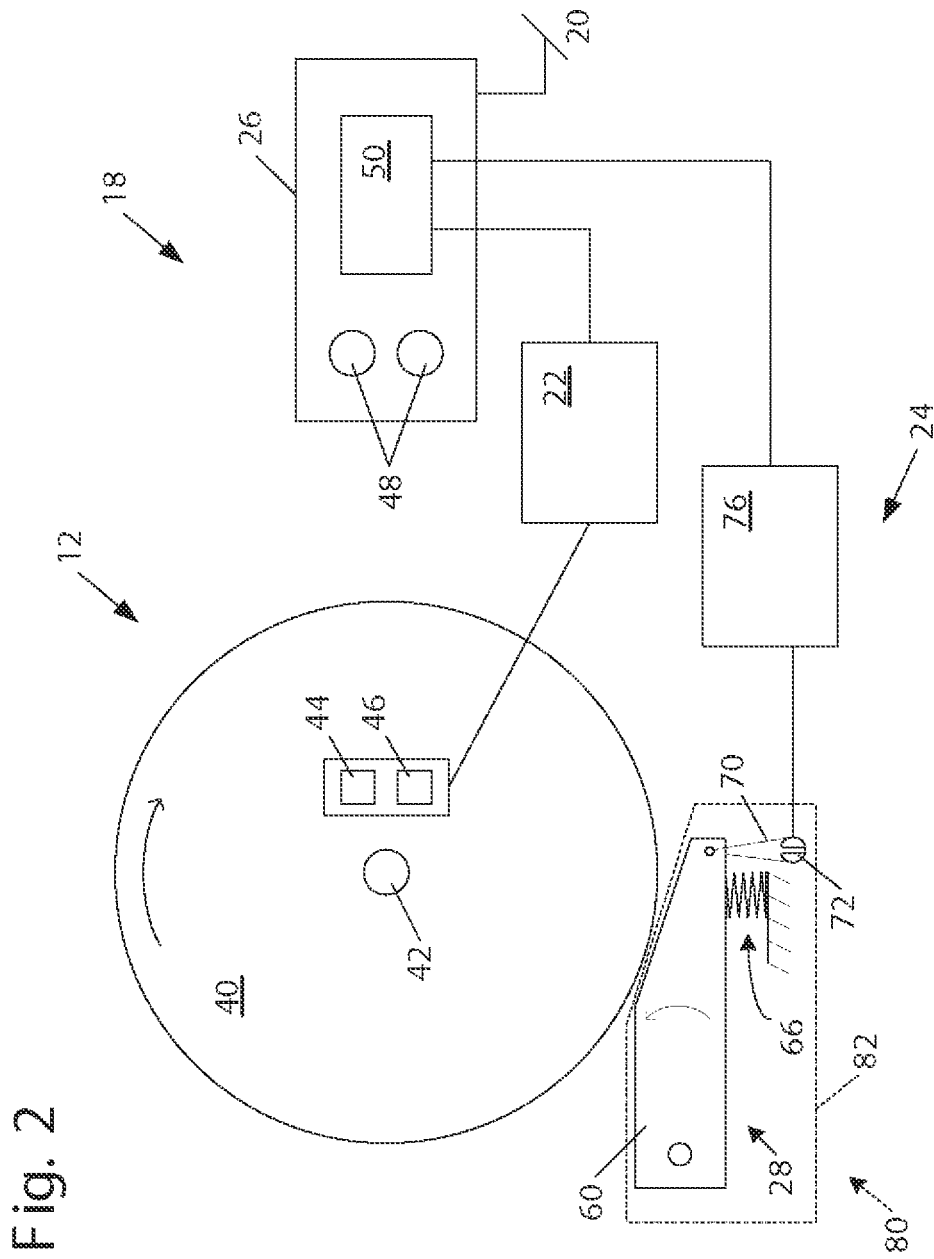
FIG. 2 is a schematic diagram of an embodiment of active injury mitigation technology in the context of a power tool having a circular blade.

Turning attention to FIG. 2, one example of the many possible implementations of safety system 18 is shown. System 18 is configured to engage an operative structure having a circular blade 40 mounted on a rotating shaft or arbor 42. Blade 40 includes a plurality of cutting teeth (not shown in FIG. 2, but shown in FIG. 3) disposed around the outer edge of the blade. As described in more detail below, braking mechanism 28 is adapted to engage the teeth of blade 40 and stop the rotation of the blade.

U.S. Pat. No. 7,137,326, entitled "Translation Stop For Use In Power Equipment," issued Nov. 21, 2006, the disclosure of which is herein incorporated by reference, describes other systems for stopping the movement of the cutting tool. Safety system 18 is described in the context of particular types of machines and power tools in the following patents and publications, all of which are herein incorporated by reference: U.S. Pat. No. 7,350,444, entitled "Table Saw With Improved Safety System," issued Apr. 1, 2008; U.S. Pat. No. 7,698,976, entitled "Miter Saw With Improved Safety System," issued Apr. 20, 2010; U.S. Pat. No. 6,880,440, entitled "Miter Saw with Improved Safety System," issued Apr. 19, 2005; U.S. Pat. No. 6,994,004, entitled "Table Saw With Improved Safety System," issued Feb. 7, 2006; U.S. Pat. No. 6,826,988, entitled "Miter Saw With Improved Safety System," issued Dec. 7, 2004; U.S. Patent Application Publication No. 2002/0056349 A1, entitled "Miter Saw With Improved Safety System," filed May 16, 2002; U.S. Pat. No. 6,945,148, entitled "Miter Saw With Improved Safety System," issued Sep. 20, 2005; U.S. Pat. No. 6,877,410, entitled "Miter Saw With Improved Safety System," issued Apr. 12, 2005; U.S. Patent Application Publication No. 2003/0015253 A1, entitled "Router With Improved Safety System," filed Jan. 23, 2003; U.S. Pat. No. 7,621,205, entitled "Band Saw With Safety System," issued Nov. 24, 2009; U.S. Pat. No. 7,000,514, entitled "Safety Systems for Band Saws," issued Feb. 21, 2006; U.S. Pat. No. 7,784,507, entitled "Router With Improved Safety System," issued Aug. 31, 2010; U.S. Pat. No. 7,347,131, entitled "Miter Saw With Improved Safety System," issued Mar. 25, 2008; and U.S. Pat. No. 7,836,804, entitled "Woodworking Machines With Overmolded Arbors," issued Nov. 23, 2010.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of the power tool. Various exemplary embodiments and implementations of detection subsystem 22 are described in more detail in U.S. Pat. No. 7,210,383, entitled "Detection System For Power Equipment," issued May 1, 2007, U.S. Pat. No. 7,284,467, entitled "Apparatus And Method For Detecting Dangerous Conditions In Power Equipment," issued Oct. 23, 2007, U.S. Pat. No. 7,377,199, entitled "Contact Detection System for Power Equipment," issued May 27, 2008, U.S. Pat. No. 7,231,856, entitled "Apparatus and Method for Detecting Dangerous Conditions in Power Equipment," issued Jun. 19, 2007, U.S. Pat. No. 7,171,879, entitled "Discrete Proximity Detection System," issued Feb. 6, 2007, U.S. Pat. No. 7,077,039, entitled "Detection System for Power Equipment," issued Jul. 18, 2006, and U.S. Pat. No. 7,707,918, entitled "Detection Systems for Power Equipment," issued May 4, 2010, the disclosures of which are all herein incorporated by reference.

Control subsystem 26 includes one or more instruments 48 that are operable by a user to control the motion of blade 40. Instruments 48 may include start/stop switches, speed controls, direction controls, light-emitting diodes, etc. Control subsystem 26 also includes a logic controller 50 connected to receive the user's inputs via instruments 48. Logic controller 50 is also connected to receive a contact detection signal from detection subsystem 22. Upon receipt of a contact detection signal from detection subsystem 22, the logic controller overrides the control inputs from the user and activates reaction subsystem 24 to stop the motion of the blade. Various exemplary embodiments and implementations of control subsystem 26, and components that may be used in control system 26, are described in more detail in U.S. Pat. No. 7,600,455, entitled "Logic Control For Fast-Acting Safety System," issued Oct. 13, 2009, U.S. Pat. No.

7,225,712, entitled "Motion Detecting System For Use In Safety System For Power Equipment," issued Jun. 5, 2007, U.S. Pat. No. 7,197,969, entitled "Logic Control With Test Mode for Fast-Acting Safety System," issued Apr. 3, 2007, U.S. Pat. No. 7,359,174 entitled "Motion Detecting System for use in a Safety System for Power Equipment," issued Apr. 15, 2008, and U.S. Provisional Patent Application Ser. No. 14/862,571, entitled "Table Saws," filed Sep. 23, 2015 by SD3, LLC, the disclosures of which are all herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as fully annealed aluminum, etc. It will be appreciated that the construction of pawl 60 may vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. The spring is adapted to urge pawl 60 into the teeth of the blade with sufficient force to grip the blade and quickly bring it to a stop. An explosive may be used instead of a spring.

When a spring is used, the pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately ⅟₃₂-inch to ¼-inch from the edge of the blade by fusible member 70, however other pawl-to-blade spacings may also be used.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. In the case of an explosive, a surge of electrical current can be passed through a fuse to ignite the explosive. Firing subsystem 76 is coupled to logic controller 50 and activated by a signal from the logic controller. When the logic controller receives a contact detection signal from detection subsystem 22, the logic controller sends an activation signal to firing subsystem 76, which heats the fuse to move the pawl into contact with the blade. Various exemplary embodiments and implementations of reaction subsystem 24 are described in more detail in U.S. Pat. No. 7,100,483, entitled "Firing Subsystem For Use In A Fast-Acting Safety System," issued Sep. 5, 2006, U.S. Pat. No. 8,490,527, entitled "Power Equipment With Systems To Mitigate Or Prevent Injury," issued Jul. 23, 2013, U.S. Pat. No. 7,024,975, entitled "Brake Mechanism For Power Equipment," issued Apr. 11, 2006, U.S. Pat. No. 6,813,983, entitled "Power Saw With Improved Safety System," issued Nov. 9, 2004, U.S. Pat. No. 6,957,601, entitled "Translation Stop For Use In Power Equipment," issued Oct. 25, 2005, U.S. Pat. No. 7,712,403, entitled "Actuators For Use in Fast-Acting Safety Systems," issued May 11, 2010, and U.S. Pat. No. 6,945,149, entitled "Actuators For Use In Fast-Acting Safety Systems," issued Sep. 20, 2005, the disclosures of which are herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge, and various brake pawls, are described in more detail in U.S. Pat. No. 7,610,836, entitled "Replaceable Brake Mechanism For Power Equipment," issued Nov. 3, 2009, U.S. Pat. No. 6,857,345, entitled "Brake Positioning System," issued Feb. 22, 2005, U.S. Pat. No. 7,661,343, entitled "Brake Mechanism for Power Equipment," issued Feb. 16, 2010, and U.S. Pat. No. 7,350,445, entitled "Brake Cartridges for Power Equipment," issued Apr. 1, 2008, the disclosures of which are herein incorporated by reference.

The exemplary implementation depicted in FIG. 2 illustrates a detection subsystem 22 that is configured to detect contact between a user and the cutting tool through a capacitive coupling between the blade and plates 44, 46. Detection system 22 includes suitable electrical circuitry (e.g., such as described in U.S. Pat. No. 7,210,383, entitled "Detection System For Power Equipment," issued May 1, 2007, the disclosure of which is incorporated herein by reference) to transmit an input signal to plate 44, and to detect the input signal through plate 46. Plate 44 is mounted close to, but spaced-apart from, blade 40. Plate 44 is capacitively coupled to the saw blade by virtue of its size and placement parallel to and spaced-apart from the saw blade. Plate 46 is also mounted close to, but spaced-apart from, the saw blade to establish a second capacitive coupling.

When a user touches blade 40, the capacitance of the user's body creates a capacitive load on the blade. As a result, the size of the capacitive shunt between the charge plates and the blade is increased, thereby reducing the charge that reaches plate 46. Thus, the magnitude of the input signal passed through the blade to plate 46 decreases when a user touches the blade. Detection subsystem 22 is configured to detect this change in the input signal and transmit a contact detection signal to logic controller 50.

Figure 3:
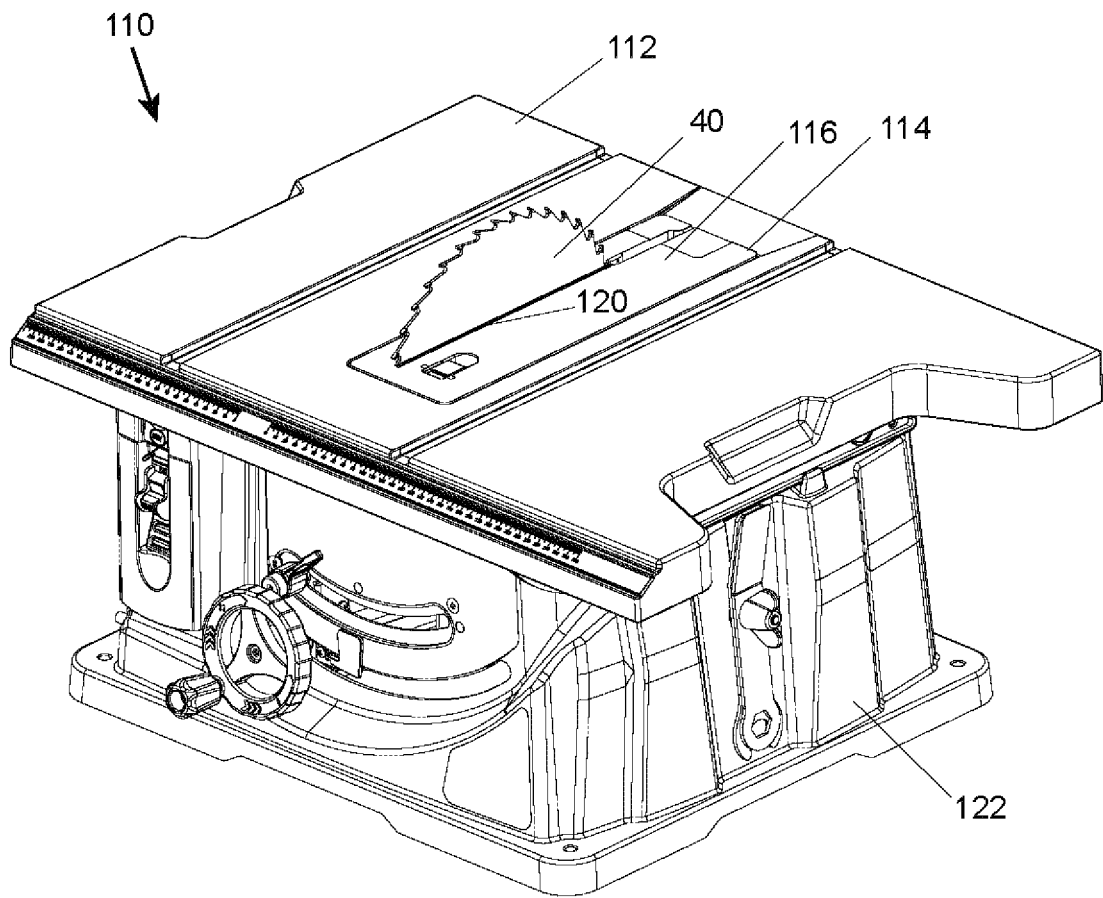
FIG. 3 shows a table saw.
Figure 4:
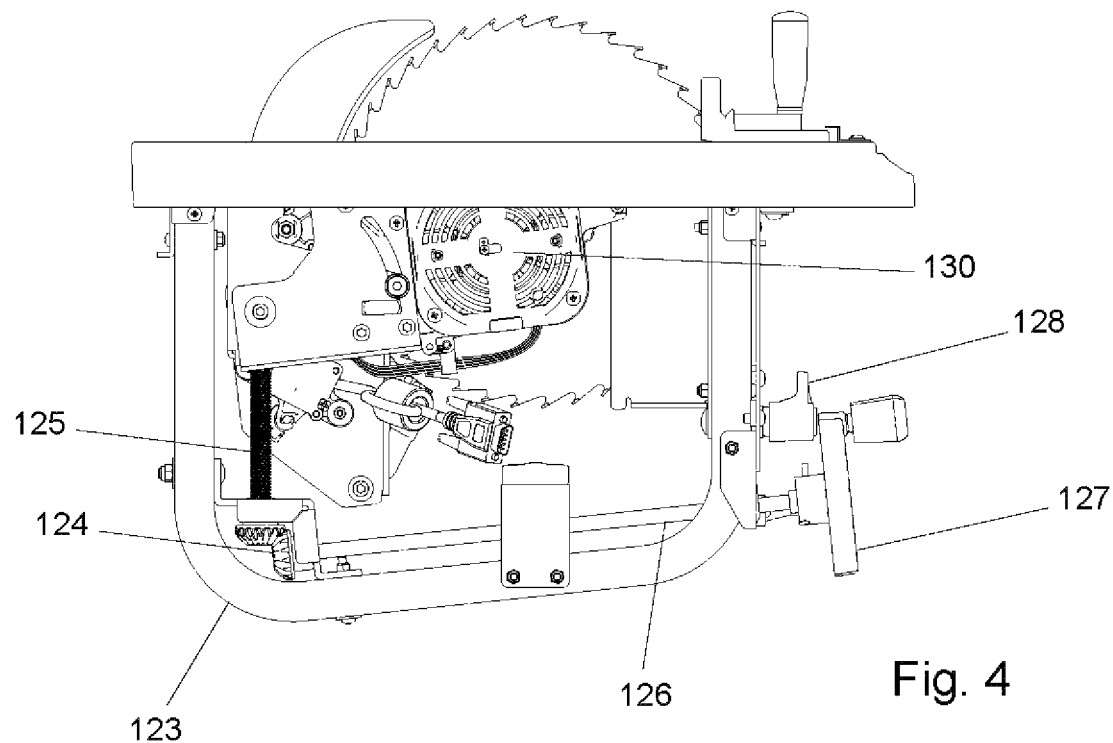
FIG. 4 shows a left side view of an internal mechanism of a table saw.
Figure 5:
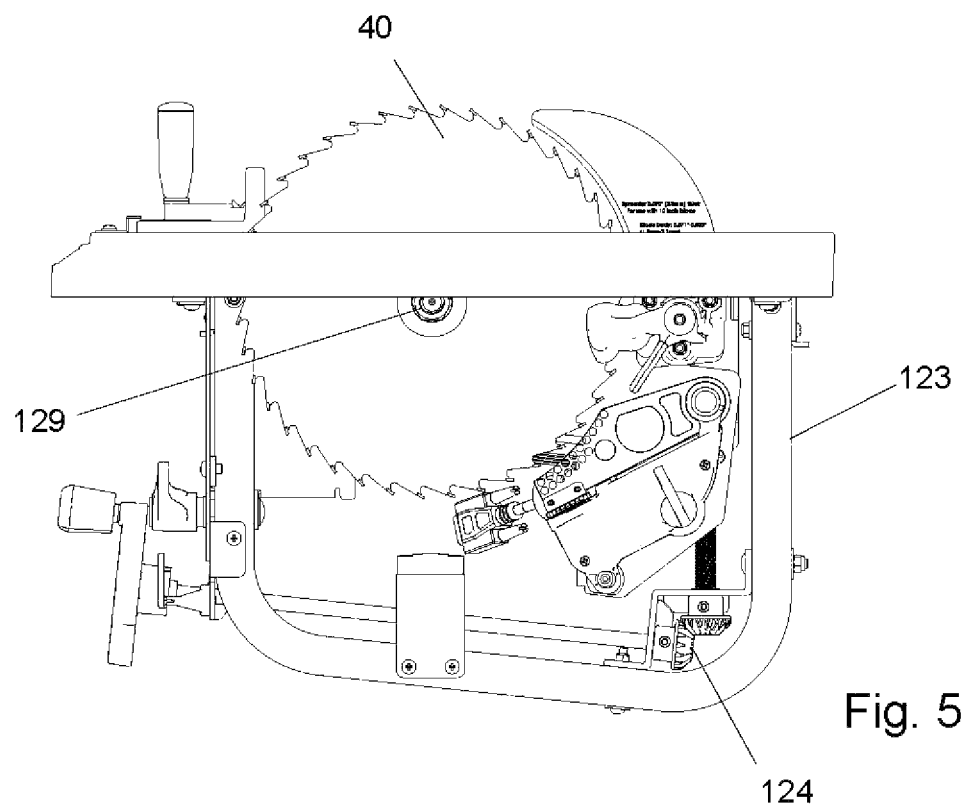
FIG. 5 shows a right side view of the internal mechanism of FIG. 4.
Figure 6:
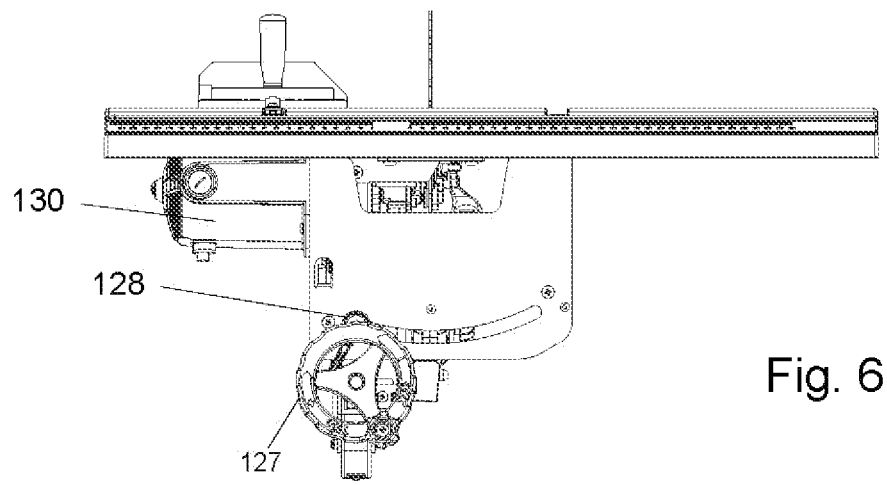
FIG. 6 shows a front view of the internal mechanism of FIG. 4.
Figure 7:
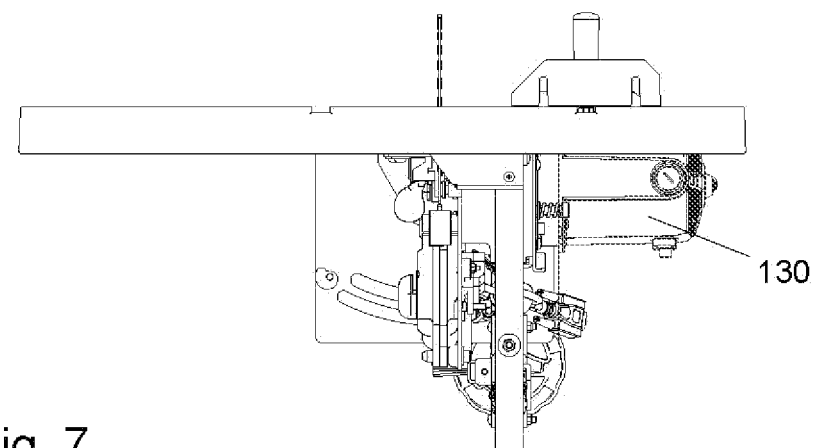
FIG. 7 shows a rear view of the internal mechanism of FIG. 4.
Figure 8:
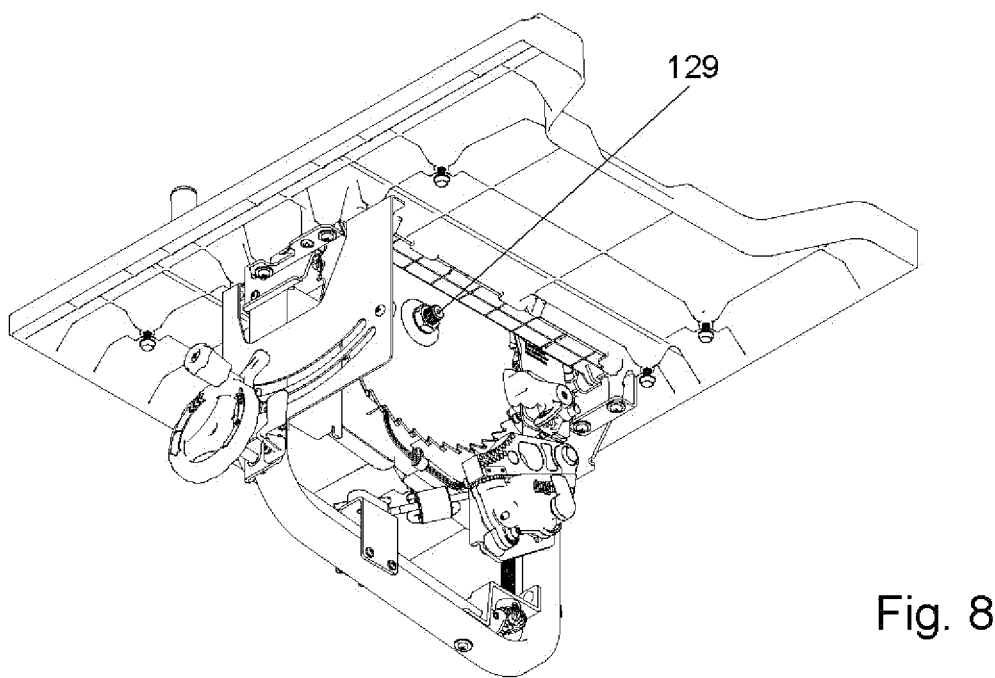
FIG. 8 shows a perspective view from below the internal mechanism of FIG. 4.

FIG. 3 shows a table saw 110 including a table 112 and a circular blade 40 extending up through a slot 120 in a table insert 116 that fits within an opening 114 in the table. A housing 122 supports the table and a motor is within the housing. The motor is operably connected to the blade so that running the motor causes the blade to spin. A workpiece, such as a piece of wood, is placed on the table and pushed into contact with the spinning blade to make a cut.

Blade 40 is mounted on a drive shaft called an arbor. One or more bearings are supported by an arbor block or trunnion within housing 122, and the bearings support the arbor and allow the arbor to rotate. The motor has a drive shaft that can be directly connected to the arbor through gears (called a direct drive) or through pulleys and one or more belts (called a belt drive). In either case, the linkage between the drive shaft and arbor is such that spinning the motor's drive shaft causes the arbor and blade to spin. In a power tool as described herein, it would be common for an arbor and blade to spin at around 4,000 revolutions per minute.

FIGS. 4 through 8 show various views of an internal mechanism that could be used in table saw 110. A bent steel tube 123 forms a trunnion supported by the table. Bevel gears 124 and an associated screw 125, shaft 126, and handwheel 127 are used to raise and lower the blade. A clamp 128 is used to tilt the blade. The blade 40 is mounted on arbor 129. A motor 130 spins arbor 129 through a gearbox, thereby driving the blade. Table saw 110 is described in more detail in U.S. Provisional Patent Application Ser. No. 62/511,234, titled "Power Saws," filed concurrently with this application on May 25, 2017, and naming James David Fulmer, Stephen F. Gass and John P. Nenadic as inventors, the disclosure of which is herein incorporated by reference.

In a table saw with active injury mitigation technology, a detection system imparts an electrical signal onto the blade and the signal is monitored for changes indicative of contact between the blade and a user. If a conductive coupling is used to impart and/or monitor the electrical signal on the blade, the conductive coupling will include some component positioned to create a conductive path between the blade and the detection system, through which the detection system can impart and/or monitor the signal on the blade. The component is positioned in the saw such that it makes direct physical contact with the blade, arbor, or with some other component in conductive contact with the blade or arbor, such as a gear or pulley mounted on the arbor.

A component making direct physical contact with the arbor or blade, however, will bounce microscopically as the arbor or blade spins. That bouncing can result in short interruptions in the contact between the component and the arbor or blade, and thus cause interruptions in the electrical signal sensed from the blade. In a system that detects contact with the blade, the contact must be detected quickly, for example on the order of 20 microseconds, so that the safety system has enough time to respond before a serious injury occurs. Interruptions in the electrical signal sensed from the blade due to bouncing, however, could delay detection and thereby lead to a more serious injury. To address this issue, multiple conductive elements may be used to make direct contact with the blade or arbor so that at least one conductive element is almost certainly in contact with the arbor at any given time. Alternatively, a solid conductive element such as a rod or solid conical brush can be placed in contact with a mass of powder, gel, or braided graphite.

One way in which direct reliable electrical contact can be maintained with the spinning blade or arbor is through the use of a brush consisting of multiple conductive fibers or filaments. The presence of multiple fibers ensures that at least some fibers are in contact with the spinning blade or arbor so that there is no interruption in the electrical contact signal sensed by the detection system. Such a contact can be thought of as being multi-contact. Using fibers or filaments of smaller size allows for the presence of an increased number of filaments in a particular area, which in turn leads to better contact between the filaments and the spinning blade or arbor, thus decreasing the likelihood that the bouncing will lead to interruptions in the signal. The use of multiple fibers or filaments also creates a more failure tolerant design due to the multitude of connections. The brush fibers may be made of a material that slides well on steel, such as brass, braided graphite, or gold, or a liner may cover the contact surface for the brush fibers to bear against. The brush fibers may be of a stiffness and length that allow them to flex gently so that they are less likely to break, but still maintain good contact with the arbor. Longer fibers allow more flex to accommodate wear.

The brush may be mounted on the arbor block or to a circuit board such that the brush fibers make contact with the spinning arbor or blade or other part coupled to the blade or arbor. The blade, arbor, and brush contact are electrically isolated from the arbor block.

Although the brush could be mounted to make contact with the blade, the blade may have a coating that could interfere with, or reduce, the quality of the electrical contact with the blade, so it can be advantageous to mount the brush in such a way that it makes contact with the arbor, which is electrically coupled to the blade. A brush that is conductively or directly coupled to the blade also provides a means for static dissipation, which can be accomplished by adding a resistor to bleed off static charge that tends to build up on the blade and arbor.

The wear that occurs on the brush fibers due to contact with a moving surface, such as contact with the spinning blade or arbor, is related to the velocity of the moving surface, or expressed differently, the wear is related to the relative velocity of the brush fibers at the contact surface. The surface velocity of the tips of the brush fibers against and relative to a contact surface that is a spinning blade or arbor is equal to $2\pi fr$, where f is the frequency of the spinning blade or arbor measured in Hertz, and r is the radius at which the brush fibers make contact with the spinning blade or arbor measured from the axis of rotation of the blade or arbor. Since the arbor and blade spin together at a specified rpm, or revolutions per minute, the surface velocity varies only with the radius r. As stated, wear on the contact surface is related to the surface velocity of the brush fibers at the contact surface, so decreasing the radius r from the axis about which the blade and arbor spin to the contact surface can lessen the wear on the contact surface. Therefore, it is advantageous to minimize radius r to minimize wear.

Figure 9:
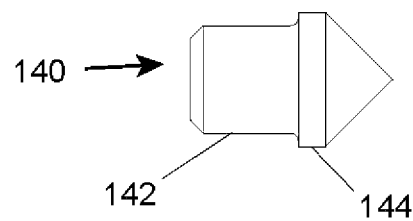
FIG. 9 shows a conductive brush.

FIG. 9 shows a brush 140, which consists of a cylindrical shaft 142 at one end of which is a short, cylindrical segment 144 of a slightly larger radius, which tapers to a point in a conical manner at an angle of about 45 degrees. The other end of the shaft 142 is beveled. Brush 140 is made of a conductive material, such as solid graphite. Brush 140 is called a brush even though it is a single, solid piece without bristles.

Figure 10:
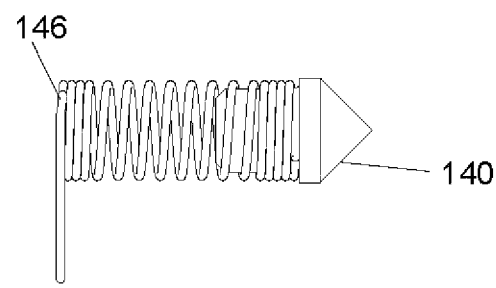
FIG. 10 shows the conductive brush of FIG. 9 installed in a compression spring.
Figure 11:
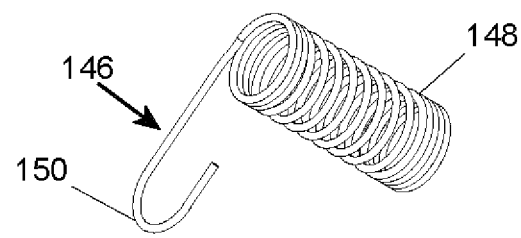
FIG. 11 shows an isolated view of the compression spring of FIG. 10.

The shaft 142 on brush 140 fits within one end of compression spring 146, as shown in FIG. 10. In this manner, brush 140 is spring biased and conformable. Compression spring 146, shown isolated in FIG. 11, includes a coil 148 with an end 150 comprised of a portion extending tangentially outward from the spring, and terminating in a U shaped bend.

Figure 12:
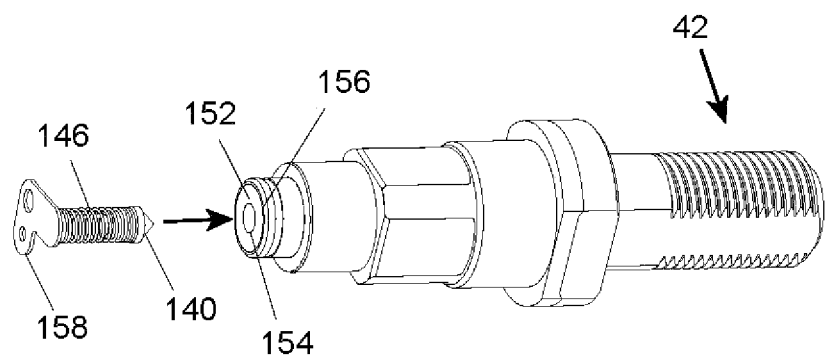
FIG. 12 shows the conductive brush of FIG. 9 aligned for insertion into a chamber that is filled with a conductive material along the axis of an arbor.

FIG. 12 shows an arbor 42, which has a cylindrical chamber 156 along the axis of the arbor. The chamber 156 is filled with a conductive material 152, which may also be referred to as a conductive packing, such as powder, gel, or braided graphite, with a small volume 154 left empty along the same axis, into which the end 144 of brush 140 is placed.

It can be advantageous to tap the hole 156 such that its surface is threaded, in order to increase the surface area, which helps keep the braided graphite or other material from coming out of the chamber as the chamber spins.

As the arbor 42 spins, the braided graphite or other conductive material spins with it. This causes the brush 140 to tend to rotate due to the friction between the brush and the conductive material 152. However, the spring 146 is configured such that, as the arbor turns, the spring tightens around shaft 142, holding brush 140 in place. The end 150 of spring 146 is conductively connected via a screw to a contact plate 158, which is then connected via wires to a circuit board used to monitor the signal measured from the blade through the arbor. An embodiment such as this can also be thought of as a multi-contact coupling because brush 140 makes contact with the braided graphite or other material at multiple points.

Spring 146 biases or pushes brush 140 against conductive material 152. Experimentation has shown that a spring force ranging from 1 to 3 Newtons provides an effective bias to create a reliable electrical connection between brush 140 and conductive material 152 without causing undue wear between the brush and the conductive packing material. Undue wear can compromise or shorten the duration of the electrical connection.

Figure 13:
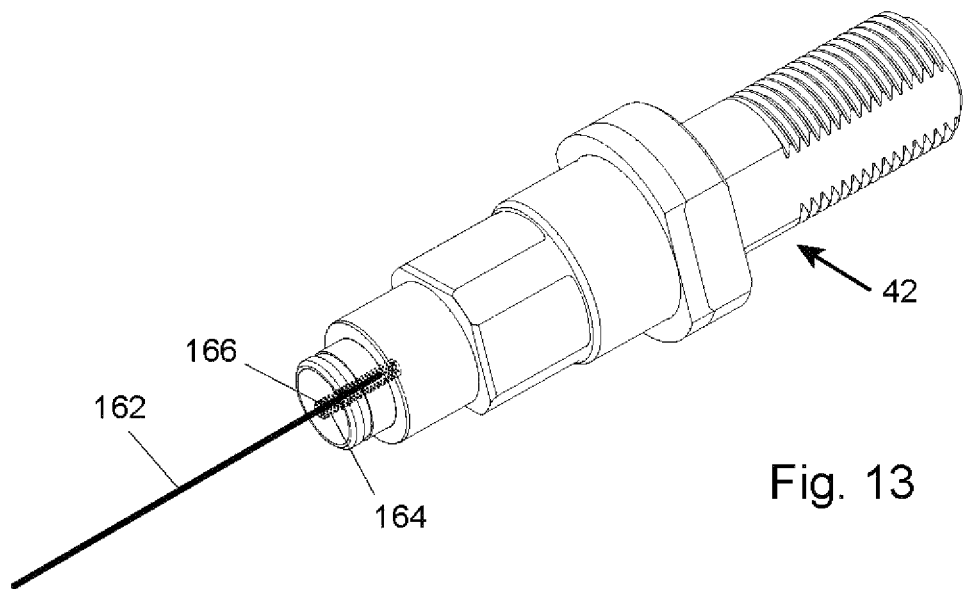
FIG. 13 shows a conductor inserted into a chamber along the axis of an arbor, and the chamber is filled with a conductive material.

FIG. 13 shows another configuration which uses a conductive material 164, such as a powder or grease, which fills a cylindrical chamber 166 along the axis of the arbor 42 into which is inserted a conductor 162, such as a metal wire or shaft, to transmit the electrical signal to the detection system. A conductive material like a powder or grease provides multiple contacts and can minimize wear. A conductive grease or powder may be used with any of the brush configurations disclosed herein, in order to help provide better contact.

Figure 14:
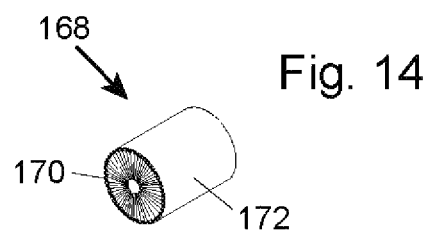
FIG. 14 shows another style of brush.
Figure 15:
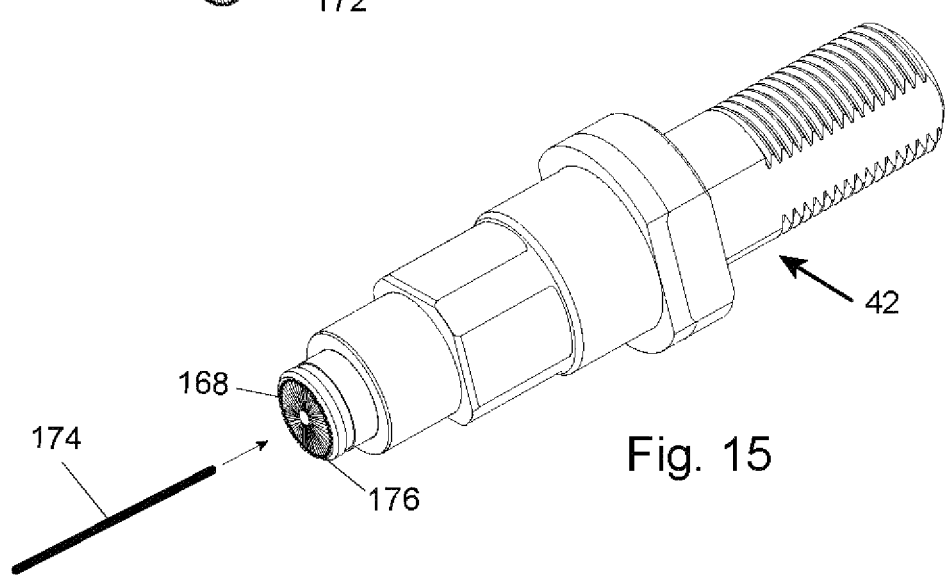
FIG. 15 shows the brush of FIG. 14 installed in a section of an arbor with a conductor leading to the brush.

FIG. 14 shows another configuration using a brush 168 of a cylindrical shape with fibers 170 extending radially inward from a cylindrical wall or container 172 that is secured within a large hole 176 in the shaft of an arbor 42, as shown in FIG. 15, such that it rotates with the arbor. This configuration allows a conductor 174 like a wire or shaft of a very small radius to be inserted into the brush along the axis of the arbor, also as shown in FIG. 15.

Figure 16:
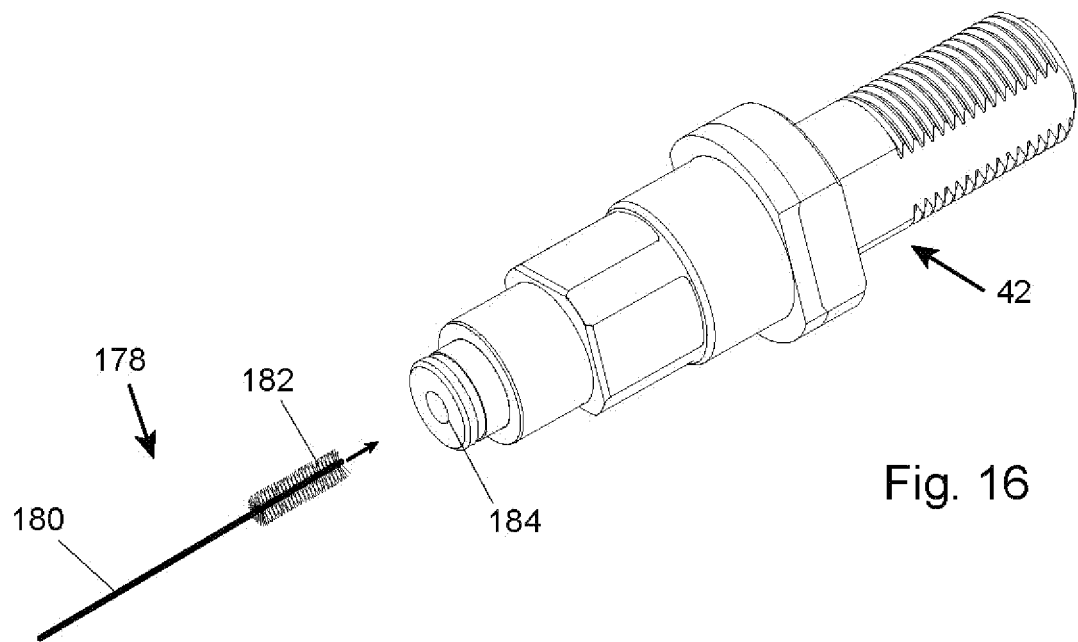
FIG. 16 shows another style of brush and an arbor.
Figure 17:
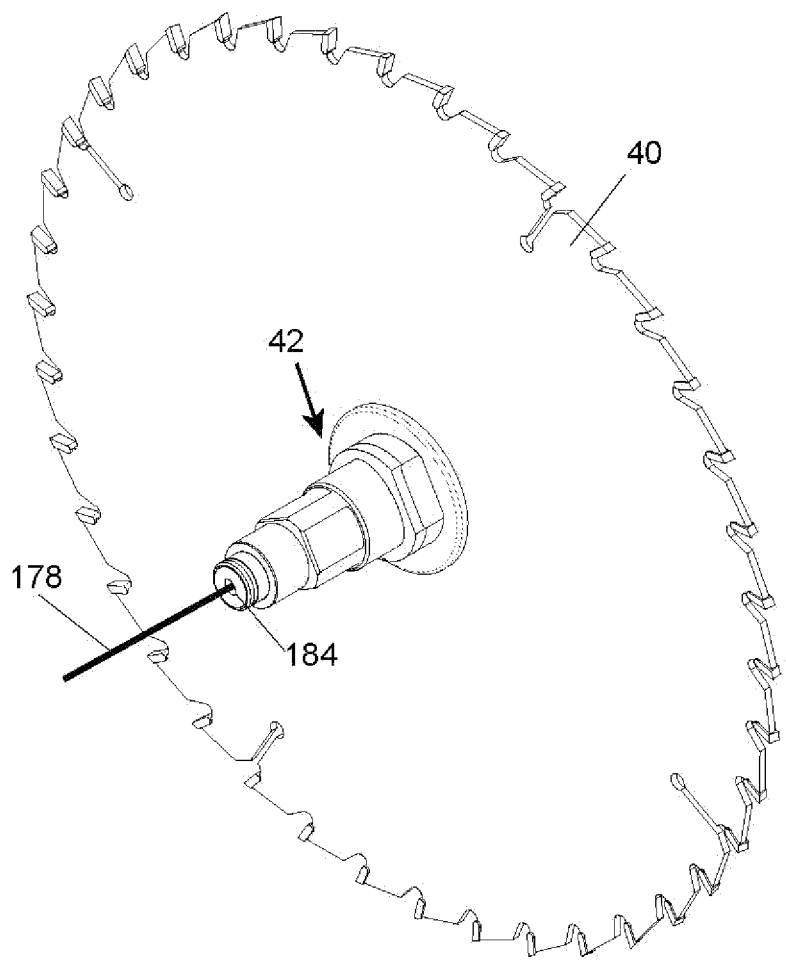
FIG. 17 shows a blade and the brush of FIG. 16 installed on a section of an arbor.

FIG. 16 shows a brush 178, which consists of a shaft 180 at the end of which is a segment 182 of about one to two inches in length that has multiple conductive fibers extending radially outward along the circumference of the shaft like a pipe-cleaner. The brush is mounted such that segment 182 is inserted into a hole 184 that extends into an arbor 42 along the axis of the arbor upon which the blade 40 is mounted, as shown in FIG. 17. Some advantages of this configuration are that the brush automatically centers itself within the hole 184 along the axis of the arbor and the radius r of the contact points relative to the axis of the arbor (i.e., the distance from the points of contact of the brush with the arbor to the axis of the arbor) can be made very small to minimize wear.

Figure 18:
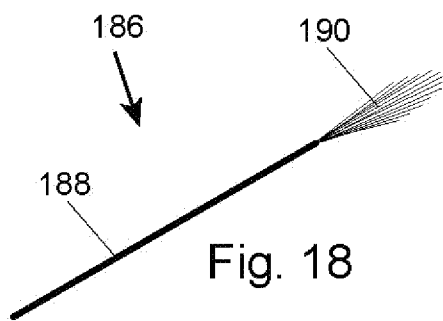
FIG. 18 shows another style of brush.

FIG. 18 shows another style of brush that can be used in the same configuration as that of FIGS. 16 and 17. Brush 186 consists of a shaft 188 at the end of which is mounted a multitude of long conductive fibers 190 extending outward beyond the shaft along the axis of the shaft. The brush would be inserted into a hole that extends into an arbor along the axis of the arbor, like brush 178 in FIGS. 16 and 17.

Figure 19:
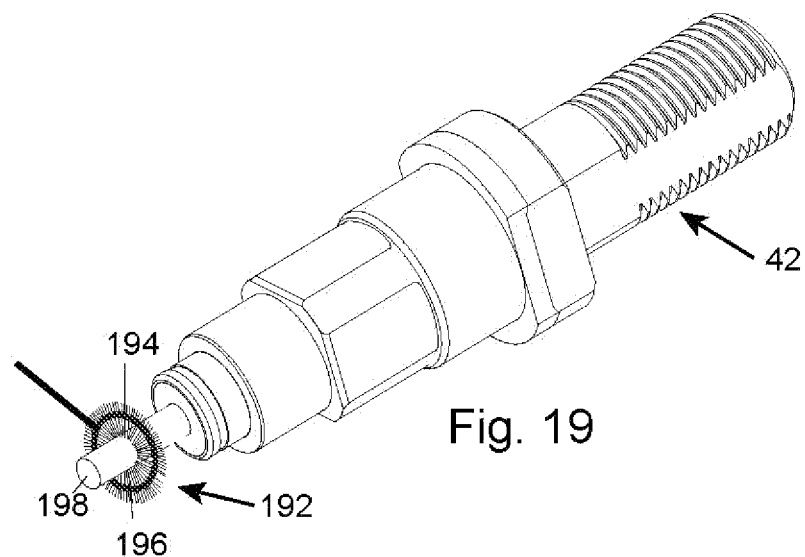
FIG. 19 shows another style of brush installed on a section of an arbor.

FIG. 19 shows another configuration using a brush 192 which consists of a circular shaft 194 around which a multiple of conductive fibers 196 extend radially inwardly along the circumference of the shaft. The arbor 42 is shaped such that there is a section 198 of the arbor opposite the end upon which the blade is mounted which has a very small diameter. Brush 192 fits over section 198 of the arbor so that the brush fibers surround section 198 of the arbor. In this configuration the radius at which the brush fibers contact the arbor can be minimized as the diameter of the shaft can be made very small while the brush fibers can be longer.

Figure 20:
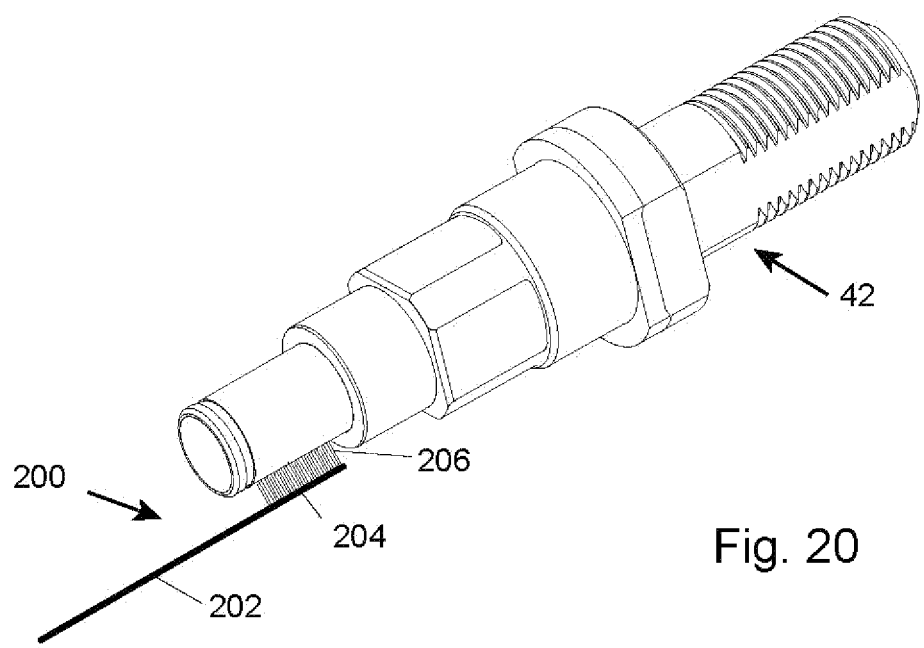
FIG. 20 shows another style of brush in contact with the outer surface of an arbor.

FIG. 20 shows a brush 200 which consists of a shaft 202 at the end of which is a segment 204 of about one to two inches in length that has multiple conductive fibers 206 extending radially outward along one side of the shaft so that there is a rectangular block of brush fibers like a toothbrush. The brush is mounted such that the fibers 206 make contact with a conductive portion on the outside of arbor 42.

Figure 21:
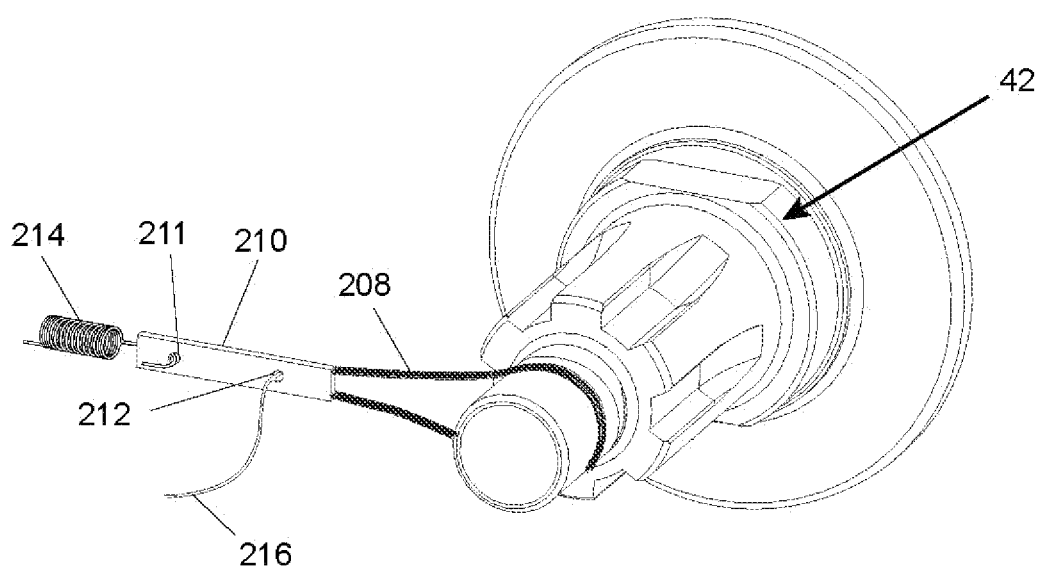
FIG. 21 shows yet another style of brush in contact with the outer surface of an arbor.

FIG. 21 shows another configuration using a brush 208 made of braided graphite or some other conductive and flexible material. Brush 208 is attached to an intermediate piece of conductive material 210, such as brass, which has two holes 211 and 212. One end of a spring 214 is attached to hole 211, and the other end of the spring is attached to an electrically isolated or nonconductive stationary component in the tool. The spring pulls brush 208 against arbor 42 to maintain contact between the brush and the arbor. A wire 216 is connected to hole 212, and the wire connects brush 208 and arbor 42 to the detection system.

Power tools such as hand-held circular saws, track saws, miter saws and the lightweight table saw shown at 110 in FIG. 3, typically include a motor that is directly coupled to a blade to drive the blade. Such a motor may be mounted on a moveable arm supported by a base as is the case of a miter saw, it may include a handle as in the case of a hand-held circular saw or a track saw, or it may be in a cabinet or housing as in the case of table saw 110. FIGS. 22 through 34 show an embodiment of a conductive coupling that is particularly applicable for these power tools.

Figure 22:
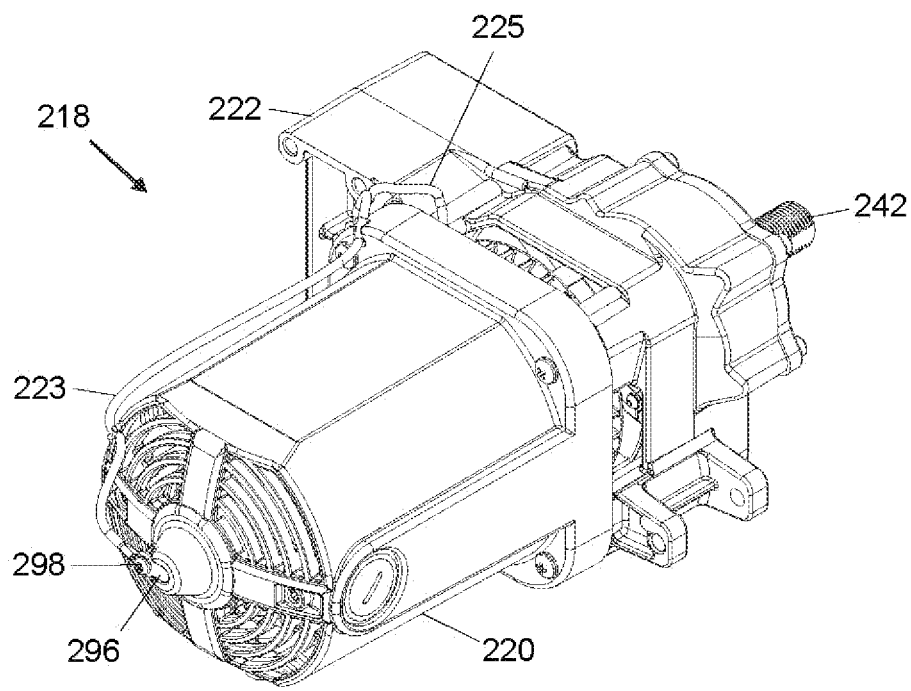
FIG. 22 shows a gearbox, motor, and arbor.
Figure 23:
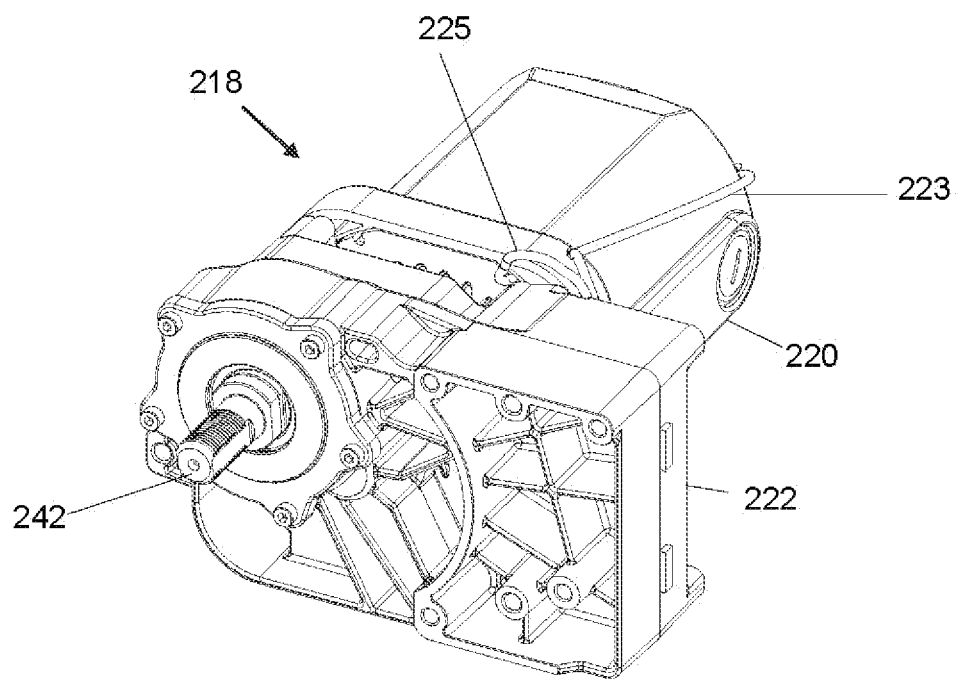
FIG. 23 shows another view of the gearbox, motor, and arbor of FIG. 22.
Figure 24:
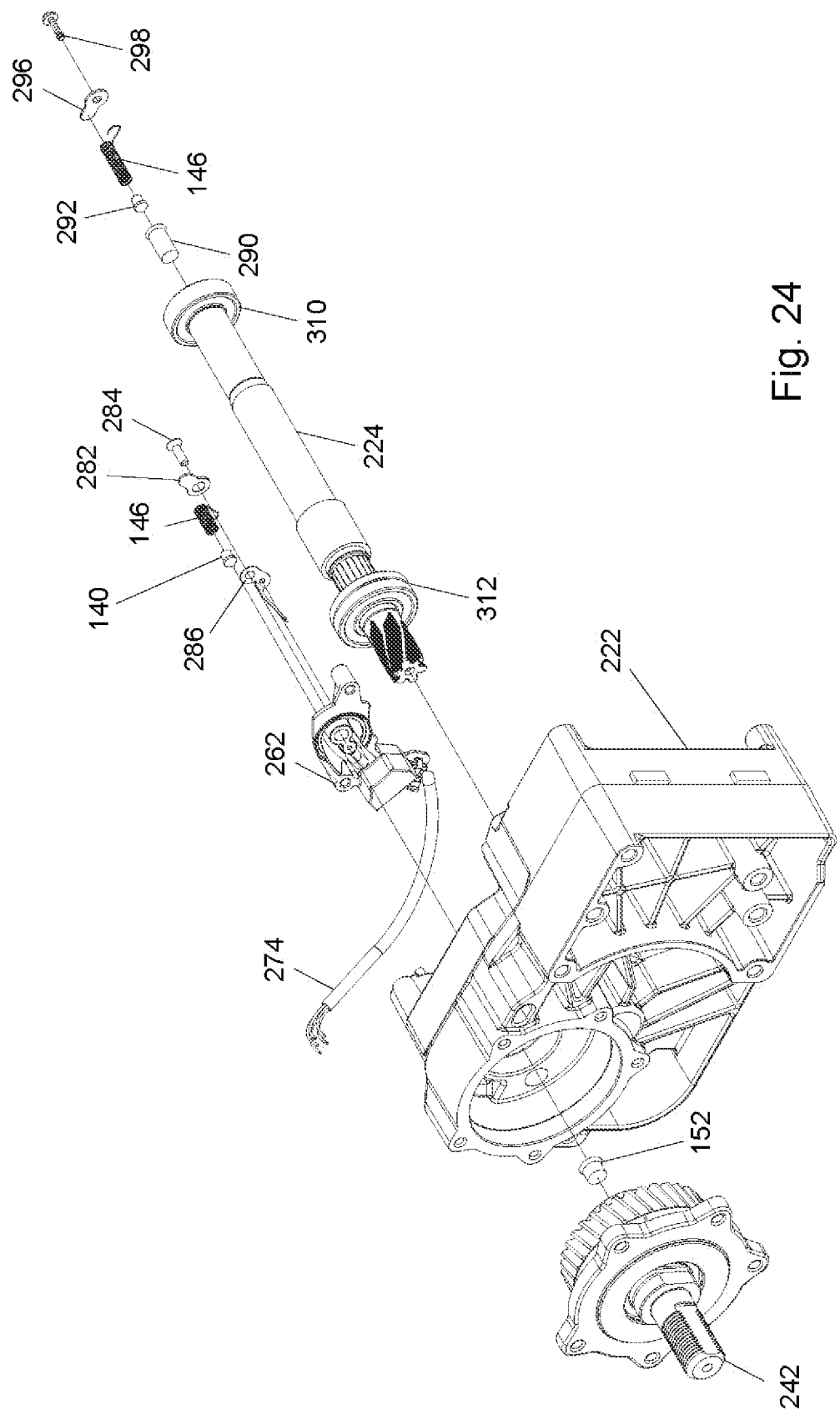
FIG. 24 shows an exploded view of the gearbox, motor, and arbor of FIG. 22, with some components removed.

The embodiment shown in FIGS. 22 through 36 includes a motor 218 with a motor shaft 224 and a housing 220 connected to a gearbox 222. An arbor 242 is supported in the gear box and a blade may be mounted on the arbor. While one particular gearbox is shown in FIGS. 22 through 24, the gearbox may take many forms depending on the power tool. Only selected portions of motor 218 are shown in FIG. 24 for simplicity. For example, FIG. 24 shows motor shaft 224 supported for rotation by bearings 310 and 312, but it does not show the motor windings and stator.

As seen in FIG. 24, a first brush 140 connects to arbor 242 to impart an electric signal to the blade for use in an active injury mitigation system, as described previously. Additionally, a second brush 292 connects to motor shaft 224 to reduce any electrical noise associated with or coming from the motor. In a power tool with active injury mitigation technology, the signal on the blade can be adversely affected by electrical noise, and electrical noise can originate, for example, from the brushes of a universal motor. Electrical noise can also come from the movement of two meshing gears as teeth on the gears move into and out of contact. Such electrical noise can be reduced by using brush 292 to ground the motor shaft.

Figure 25:
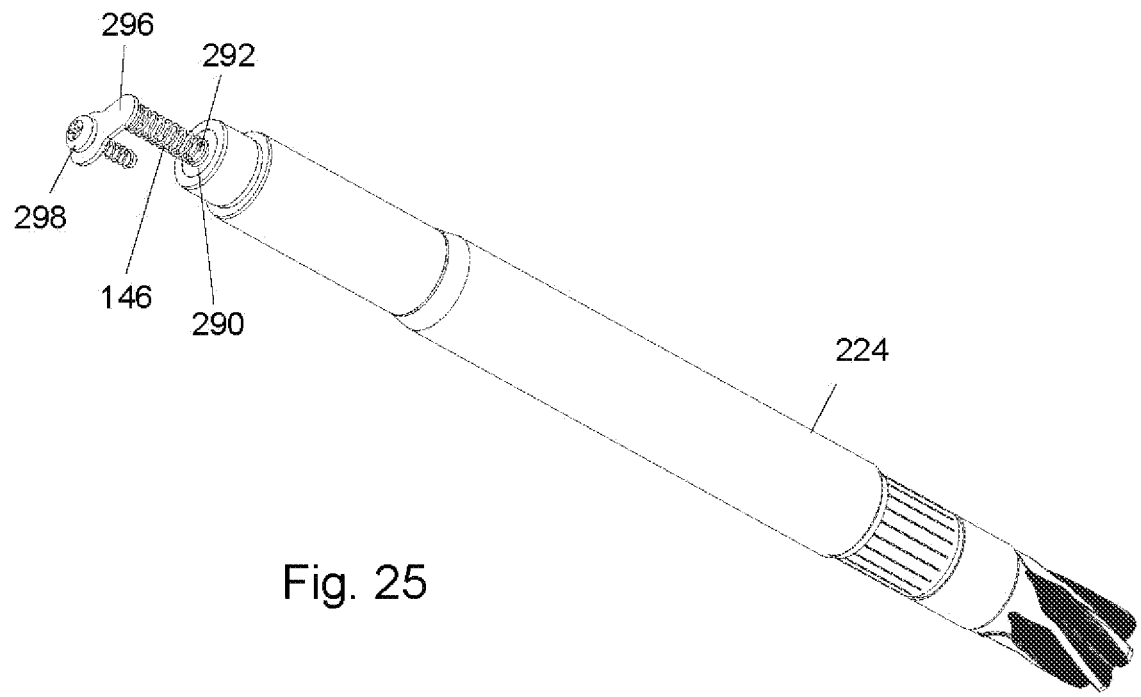
FIG. 25 shows a brush installed in a section of a motor shaft.

Brush 292 is like brush 140 discussed previously in connection with FIGS. 9 and 10. The shaft of the brush 292 fits in compression spring 146, and the conical end of the brush rests in a hole in a piece of conductive material 290 in motor shaft 224, as seen in FIG. 25. The U-shaped end of spring 146 rests against a contact plate 296, which is made from a conductive piece of material, such as metal. A screw 298 is used to attach contact plate 296 to the exterior of motor housing 220 as can be seen in FIG. 22.

Figure 26:
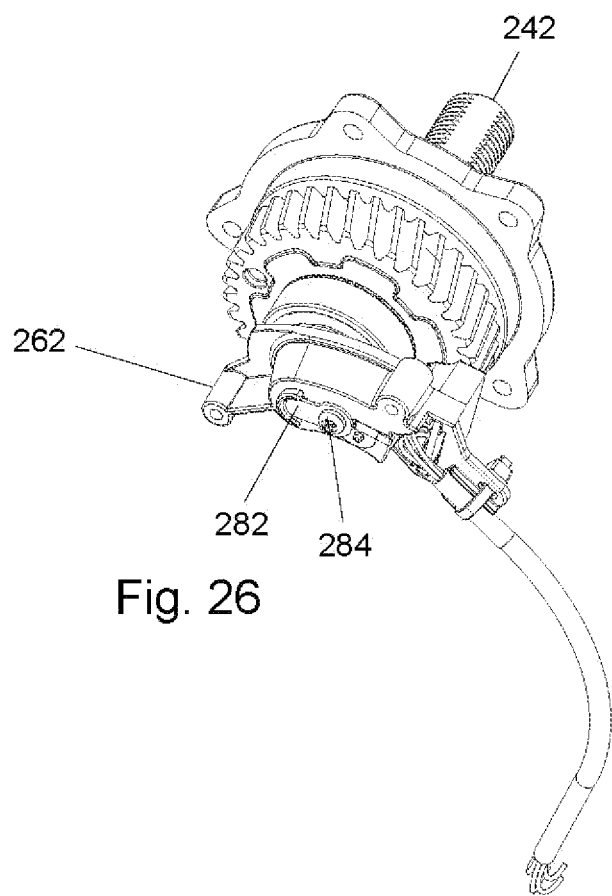
FIG. 26 shows an arbor with some components installed thereon.
Figure 27:
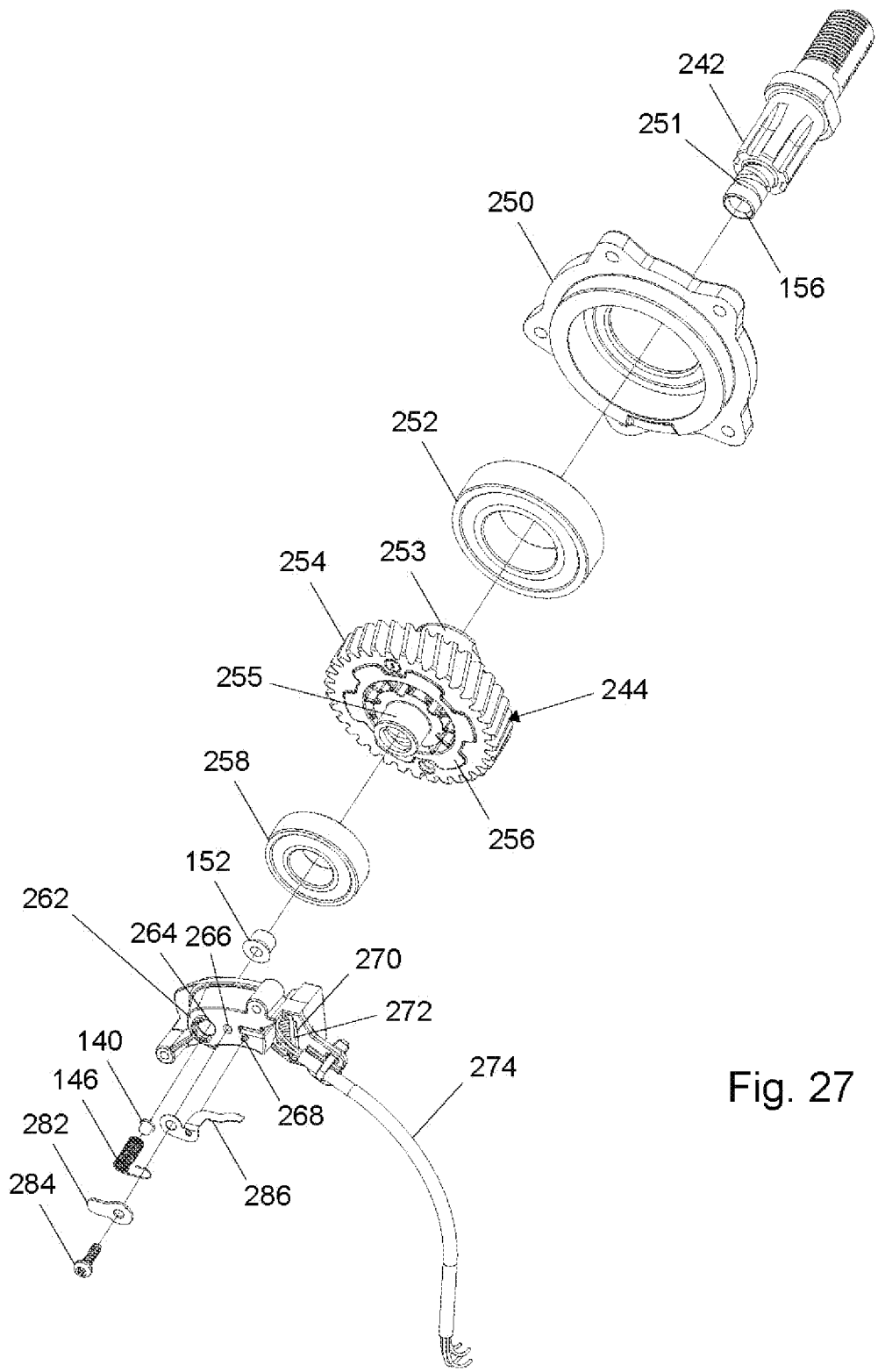
FIG. 27 shows an exploded view of the arbor and components of FIG. 26.
Figure 28:
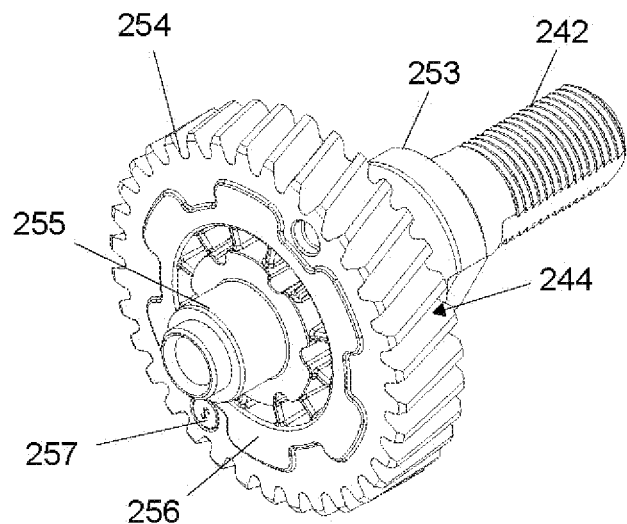
FIG. 28 shows the arbor of FIG. 26 with an isolated gear.
Figure 29:
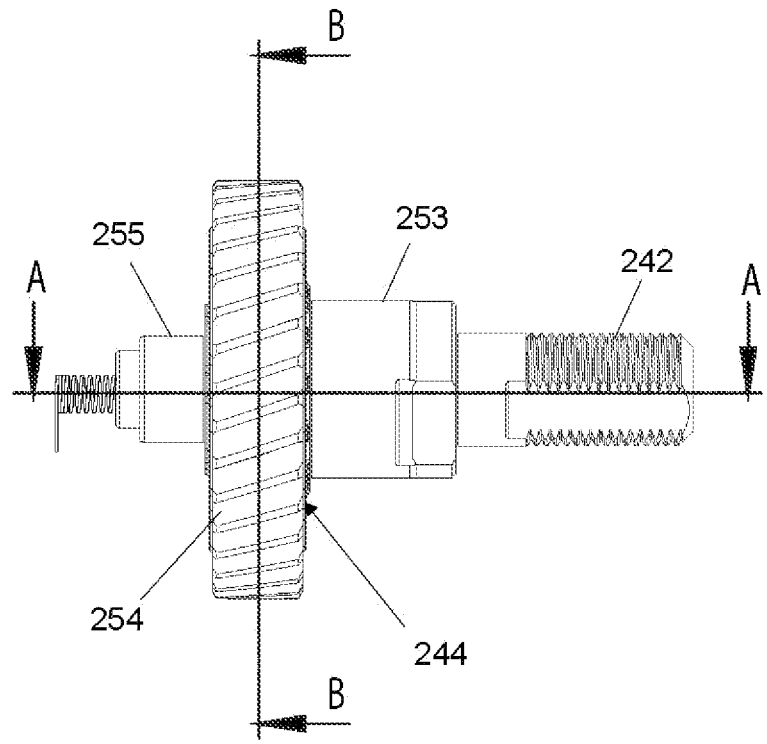
FIG. 29 shows a side view of the arbor and gear of FIG. 28.

FIG. 26 shows first brush 140 connected to arbor 242 to impart an electrical signal on the blade, and FIG. 27 shows an exploded view of that connection. A gear 244 provides the electrical isolation between the arbor and motor shaft 224 necessary to impart the electrical signal to the blade. In FIG. 27, gear 244 is shown exploded from arbor 242 for clarity, even though in the depicted embodiment arbor 242 and gear 244 are manufactured as one piece, as will be discussed later. Arbor 242 fits through the opening in a bearing cup 250, which is shaped to fit around a large ball bearing 252. Bearing cup 250, in turn, is attached to gearbox 222. Bearing 252 fits over a non-conductive bearing seat 253 formed over arbor 242, and the bearing seat is integral with a non-conductive inner ring 256 of gear 244. Similarly, a small ball bearing 258 fits over a non-conductive bearing seat 255, also formed over arbor 242 and integral with inner ring 256. In this manner, bearings 252 and 258 support the arbor for rotation, while inner ring 256 and bearing seats 253 and 255 isolate the arbor electrically from motor shaft 224.

Figure 30:
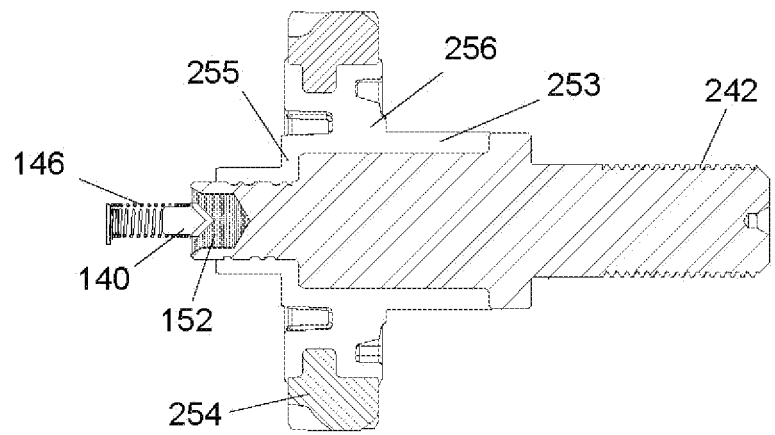
FIG. 30 shows a cross-sectional view of the arbor and gear of FIG. 28 along the line A-A in FIG. 29.

One end of arbor 242 has an opening 156, which, as discussed previously, can be filled with a conductive material 152 (shown in cross-section in FIG. 30). And the conductive material 152 has an opening into which brush 140 fits. The cylindrical end of brush 140 fits into compression spring 146, also as discussed previously. A contact plate 282 holds spring 146, and therefore brush 140 in place so it remains in contact with conductive material 152. A signal cap 262 is attached over the end of arbor 242 and brush 140. Brush 140 and one end of spring 146 pass through a hole 264 in signal cap 262. The signal cap helps to secure the conductive coupling components at the end of the arbor, and also houses a circuit board 272 in a potted well 270, as will be discussed in more detail later. A screw 284 passes through a hole in contact plate 282, through the U-shaped end of spring 146 (labeled 150 in FIG. 11), through a hole in a signal coupling electrode 286, and into a hole 266 in signal cap 262. Signal coupling electrode 286 is a bent, metal component which conducts an electrical signal from brush 140 to circuit board 272. A second hole in signal coupling electrode 286 fits over a guide pin 268 on signal cap 262.

As mentioned previously, in a power tool equipped with an active injury mitigation system that imparts an electrical signal to the blade to detect accidental contact with a person, such as table saw 110, the blade must be isolated from electrical ground to maintain the signal on the blade. In the depicted embodiment, electrical isolation of the blade is accomplished through gear 244. Specifically, the hub of gear 244 is non-conductive. In other words, a layer of non-conductive material is positioned between the outer ring of the gear and the arbor.

Figure 31:
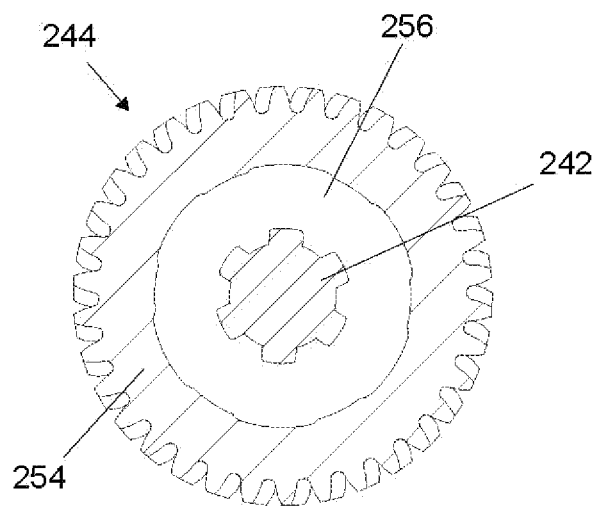
FIG. 31 shows a cross-sectional view of the arbor and gear of FIG. 28 along the line B-B in FIG. 29.
Figure 32:
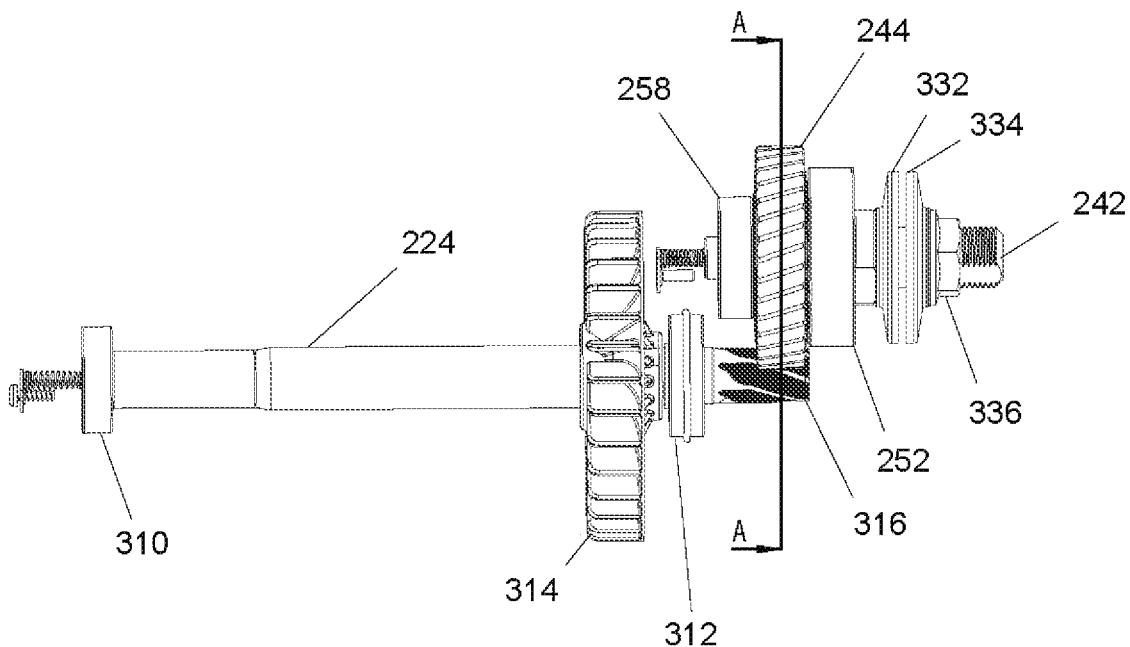
FIG. 32 shows the motor of FIG. 22 with some components removed.
Figure 33:
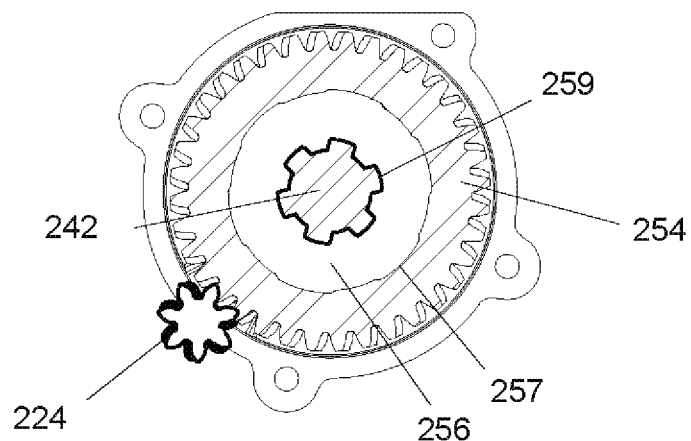
FIG. 33 shows a cross-sectional view of the motor components of FIG. 32 along the line A-A in FIG. 32.
Figure 34:
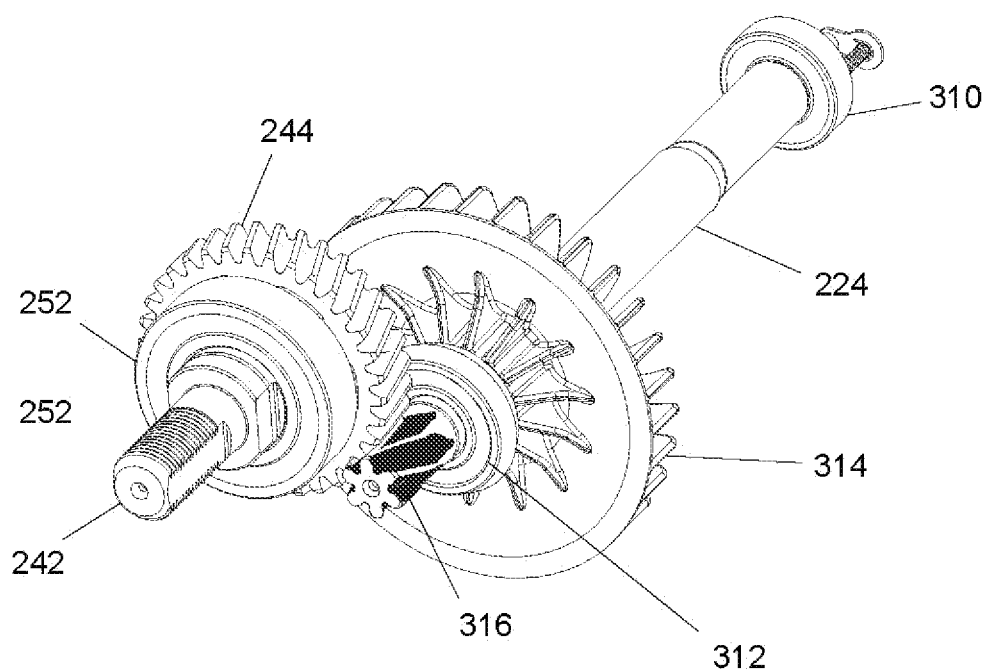
FIG. 34 shows a perspective view of the motor components of FIG. 32.

FIGS. 28 through 33 show arbor 242 and gear 244 in more detail, including cross-sectional views in FIGS. 30, 31 and 33. As can be seen, gear 244 includes an outer ring 254, which includes the teeth of the gear. Outer ring 254 is made from metal, and specifically, can be made from powder metal or from a metal such as steel that is forged and cut. A non-conductive inner ring 256, made from plastic, ceramic, or some other non-conductive material, is arranged concentrically along the interior of outer ring 254. Splines or keys, such as spline 257, prevent slipping or rotation between outer ring 254 and inner ring 256. Arbor 242 is made from a metal such as steel, and the end of arbor 242 on which gear 244 is mounted has keys or splines, such as spline 259, which prevent slipping or rotation between inner ring 256 and arbor 242. Inner ring 256, which is non-conductive, provides the necessary electrical isolation between arbor 242 and outer ring 254.

The depicted embodiment of gear 244 has the advantage of maintaining the strength of a gear with metal teeth while giving the necessary electrical isolation. The non-conductive inner ring is positioned outward from the axis of rotation of the gear to maximize the surface area in contact with outer ring 254 to minimize shear and to provide more torque. The gear and rings may take many different forms, and different numbers of rings may be used. The present embodiment is advantageous because the non-conductive inner ring 256 can be made from a dielectric material such as injection molded plastic to reduce manufacturing costs.

One important consideration is the width of the gap between the conductive arbor 242 and the conductive outer ring 254. If the gap is narrow, capacitance between the arbor 242 and the motor shaft 224 can increase, leading to coupling and noise, which can interfere with monitoring the signal on the blade and detecting accidental contact between a user and the blade. It is advantageous to maximize the amount of dielectric isolation material and minimize the quantity of conductive material without compromising the structural integrity of gear 244. As an example, in a power tool with an active injury mitigation implementation where an electrical signal is imparted to the arbor and blade, noise may come through the gear driving the arbor, such as gear 244 discussed herein. The teeth on the gear are in conductive contact with the motor shaft, and as the teeth mesh, any signal on the arbor can be perturbed by the movement of the gear teeth moving closer to and then further away from the motor shaft due to capacitance between the gear teeth and the arbor. Such perturbations can be called noise, and that noise can be sufficiently big and variable to affect the ability to detect reliably changes in the signal on the blade that indicate contact between a person and the blade. Providing a sufficient gap of non-conductive material between the arbor and the gear teeth minimizes such noise.

In the depicted embodiment, the diameter of inner ring 256 measured from the outside of one spline 257 to the outside of the opposite spline is 36.5 mm, and the diameter of the inner ring between the splines is 36 mm, making each spline 0.5 mm tall. And the diameter of arbor 242 measured from the outside of one spline 259 to the outside of the opposite spline is 19 mm, while the diameter of the arbor between the splines is 15 mm, making each spline 4 mm tall. Of course, gear 244 can be sized to achieve the desired rotation speed of the blade. A common speed of rotation of the blade and arbor in a power tool as described herein is 4,000 revolutions per minute.

The material forming inner ring 256 is selected to have a coefficient of thermal expansion similar to the material forming outer ring 254 and arbor 242 to minimize any change of dimension that might result in slippage between the shaft, inner ring and outer ring.

In the depicted embodiment, gear 244 and arbor 242 are manufactured as one piece. Arbor 242 and outer ring 254 are first formed, such as by machining or by forming from powder metal, or both. The arbor and outer ring are then positioned in a mold, and a non-conductive material is then injected into the mold between the arbor and the outer ring. The non-conductive material molds over the surface of the arbor and fills the space between the arbor and the outer ring to form non-conductive inner ring 256. At the same time, the non-conductive material forms bearing seats 253 and 255 mentioned earlier. Grooves 251 can be cut into the end of arbor 242, as shown in FIG. 27, to increase the contact area between the arbor and bearing seat 253, thereby minimizing the chance of gear 244 moving relative to the arbor.

As seen in FIG. 32, motor shaft 224 (which may be called a drive shaft) includes a pinion gear 316 at one end. Pinion gear 316 meshes with gear 244 so that when motor shaft 224 spins pinion gear 316, pinon gear 316, in turn, drives gear 244 and arbor 242. The reverse is also possible; gear 244 could be on motor shaft 224, and gear 244 could drive another gear or pinion on arbor 242. Blade 40 is held on arbor 242 by collars 332 and 334, and by nut 336 which threads onto a threaded end of arbor 242. Thus, when motor shaft 224 and pinion gear 316 spin, gear 244 and arbor 242 also spin. In that manner the motor drives the blade. Gears 316 and 244 can be sized to cause the blade to spin at a desired speed.

It has been found experimentally that a conductive shaft diameter of 15-19 mm, a non-conductive inner ring diameter of 38-46 mm, and an outer ring diameter of 52-59 mm provides an optimum balance of strength and electrical isolation.

FIG. 32 also shows a motor fan 314 that is used to cool the motor.

Motor housing 220, shown in FIGS. 22 and 23, can also be coated with an electrically conductive material, such as conductive paint, either on the inside or outside of the motor housing, or both, to provide a shield to tend to block electrical noise such as radio frequency interference or electromagnetic interference. Due to its size and composition, blade 40 can function as an antenna and interfere with the intended function of the active injury mitigation system. In order to minimize this problem, the motor is electrically isolated, or "put in a tin can." The stator core of the motor can be grounded to further address this issue, and as described herein, the motor shaft can be grounded through a conductive coupling. Interference from electrical noise is further minimized through the use of shielded cables. It can be seen in FIGS. 22 and 23 that two wires, 223 and 225, extend from the interior of motor housing 220. Wire 223 is used to ground the motor shaft, as described above, and wire 225 grounds the stator through a simple static or non-moving connection. These alternatives can be used together to shield or block electrical noise.

Figure 35:
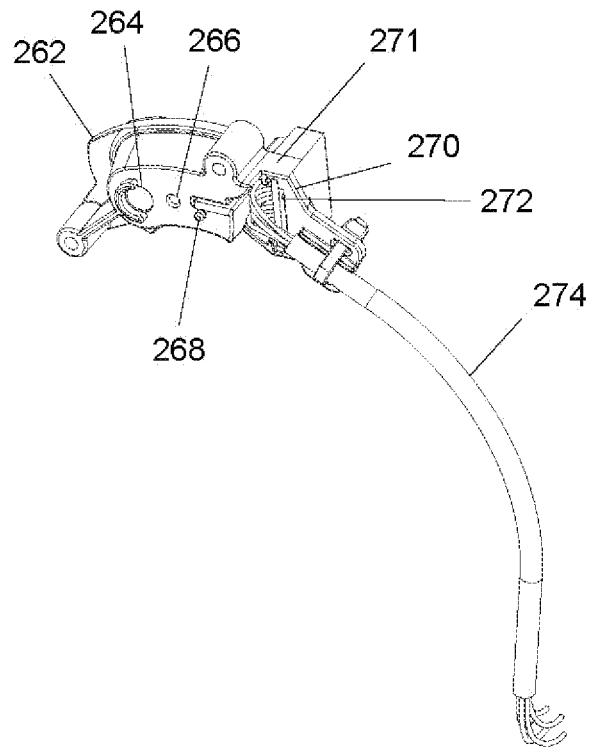
FIG. 35 shows signal cap.
Figure 36:
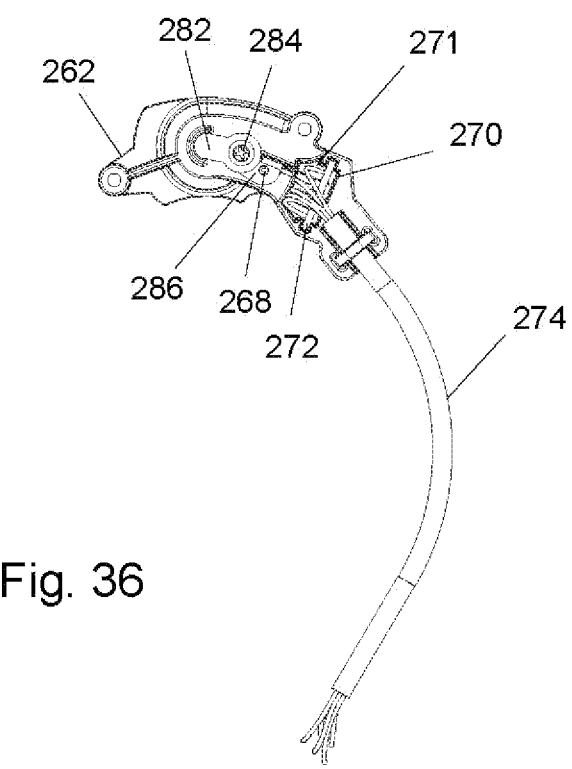
FIG. 36 shows another view of the signal cap of FIG. 35.

FIGS. 35 and 36 show signal cap 262 isolated from the rest of motor 218. As discussed previously, signal cap 262 is used to hold brush 140, signal coupling electrode 286, and circuit board 272 in place. Circuit board 272 includes a Hall Effect sensor, which monitors the motion of a magnet 257 (labeled in FIG. 28) to sense the rotation of arbor 242. Circuit board 272 is potted using a material 271, such as plastic, which serves to dissipate heat and protect the circuit board from dust. Using solid or braided graphite for brush 140 or material 152 can result in conductive graphite dust spreading onto circuit board 272, which can lead to electrical noise and/or interfere with signal detection. In the depicted embodiment, circuit board 272 transfers the signal from brush 140 to cable or wire 274. Cable 274 includes multiple conductors, one to transfer the signal from brush 140, one to transfer the signal from the Hall Effect sensor, one for power, and one for ground. Cable 274 also includes a shield, which can be thought of as a conductor.

Figure 37:
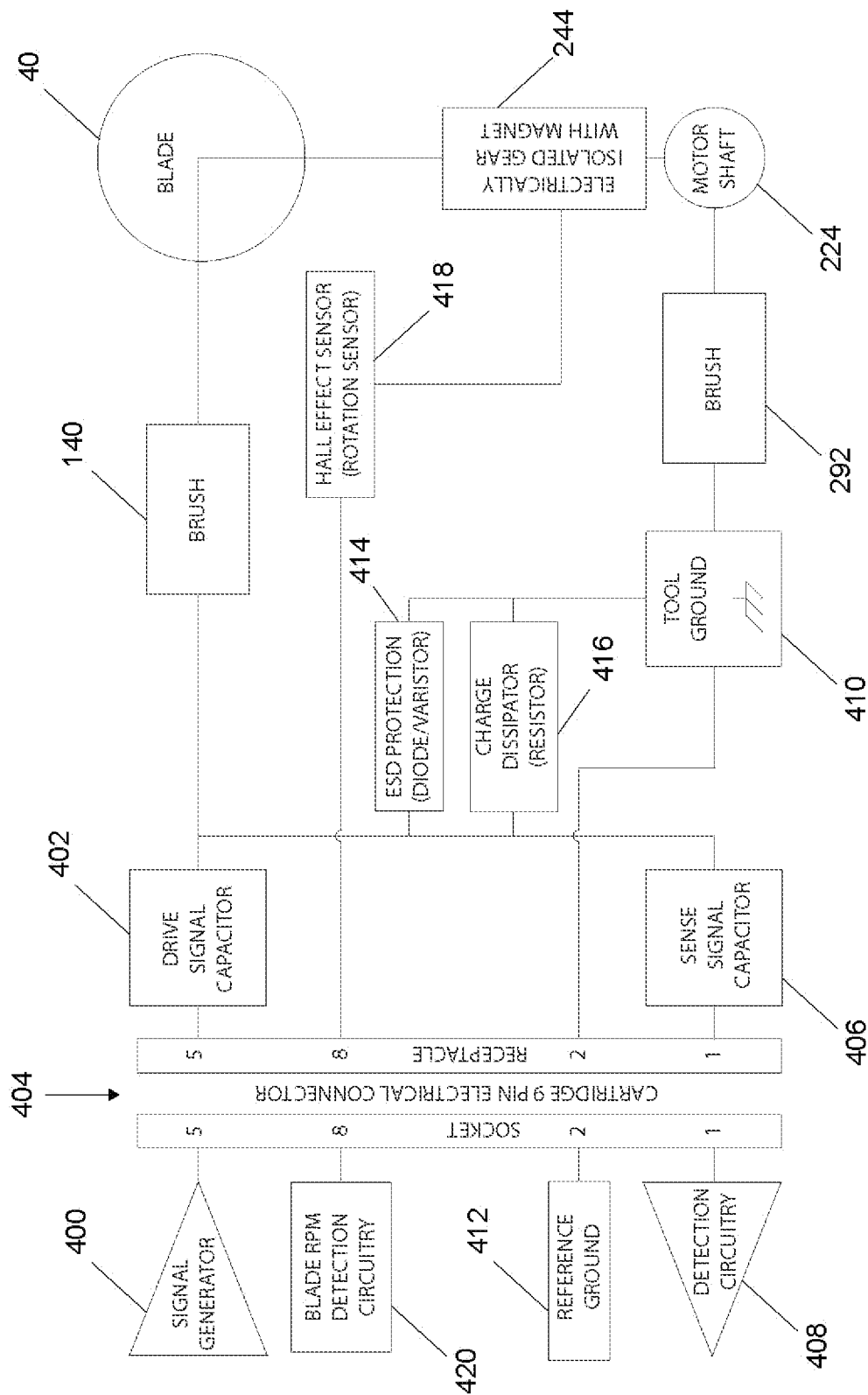
FIG. 37 is schematic circuit drawing of a conductive coupling to a blade and a conductive coupling to a motor shaft.

FIG. 37 is schematic circuit drawing of a conductive coupling to an arbor, and a conductive coupling to a motor shaft, in a power tool with active injury mitigation. Brush 140 is conductively coupled to blade 40 to impart and monitor an electrical signal to the blade, as described above. The electrical signal is generated by signal generator 400, and transmitted to the blade through brush 140. Brush 140 is connected to signal generator 400 through electrical connector 404. In some embodiments, a drive signal capacitor 402 may be interposed between signal generator 400 and brush 140. Blade 40 and brush 140 are also coupled to detection circuitry 408. When the signal on the blade changes in a manner indicative of human contact with the spinning blade, detection circuitry 408 sees that change and can trigger injury mitigation, such as by stopping and/or retracting the blade. In some embodiments, a sense signal capacitor 406 may be interposed between the detection circuitry and the blade.

Detection circuitry 408 can also detect a minimum standard sensed signal or minimum load. The absence of the minimum standard sensed signal or minimum load would indicate that cable 274, or at least the conductor transferring the signal from brush 140, is broken, and therefore, the ability of the active injury mitigation system would be compromised. The minimum load would be from the arbor, arbor bearings, and blade.

FIG. 37 also shows brush 292 conductively coupling motor shaft 224 to tool ground 410. Tool ground 410 provides a reference ground 412 through connector 404 for signal generator 400 and detection circuitry 408. Brush 140 is also connected to tool ground 410 through a diode or varistor 414 to provide electrostatic discharge protection, and through a resistor 416 for charge dissipation.

FIG. 37 also shows gear 244 driven by motor shaft 224, as explained. Gear 244 can include magnet 257 which communicates with Hall Effect sensor 418 to detect and monitor blade rotation. The Hall Effect sensor is mounted on circuit board 272 in a position to detect the motion of magnet 257. The Hall Effect sensor is connected to blade rpm detection circuitry 420 through connector 404.

Experimentation has shown that in a power tool with a spinning arbor, a conductive coupling as described herein can maintain a conductive path to the blade for 40 to 250 hours or more of cumulative time when the arbor is spinning without a material signal interruption. A material signal interruption is an interruption in the signal that would trigger an active injury mitigation response. In currently available table saws with active injury mitigation technology, a material interruption would have a duration of approximately 20 microseconds or more. However, the duration of a material interruption will vary depending on the specific power tool and the implementation of active injury mitigation technology, and therefore might be shorter or longer than 20 microseconds. Whether a conductive coupling can maintain a conductive path to the blade for 40 to 250 hours without a material signal interruption can be demonstrated by incorporating a conductive coupling in a power tool equipped with active injury mitigation technology, running the tool for the specified time, and observing if the active injury mitigation technology triggered during that time. Any such triggering would indicate a material interruption in the signal, assuming all other components or aspects of the active injury mitigation system performed and/or functioned as expected.

In a power tool with a spinning arbor and a conductive coupling with the spinning arbor, the component of the conductive coupling that can wear and thereby cause a material signal interruption is the brush. However, brushes like brush 140 described herein have minimal wear so that the brush lasts 40 to 250 hours or more. This is in part due to the brush making an electrical connection with the spinning arbor near the axis of rotation of the arbor, as explained previously. Making an electrical connection with a spinning arbor at or near the axis of rotation of the arbor can be thought of as axial contact.

Some conductive couplings described herein may be described as two-sided couplings where one side of the coupling is a rigid component or surface and the other side of the coupling is a pliable, compliant, and/or conformable component. For example, an arbor or a blade is a rigid component that can be one side of a conductive coupling, and multiple, pliable filaments, which can be compliant, and conformable, can be the other side of a conductive coupling. Other conductive couplings described herein may be thought of as two-sided couplings where both sides of the coupling are compliant or conformable. For example, a spring-biased solid brush is compliant or conformable because of the spring and it may be one side of a conductive coupling. A braided graphite, powder, or gel is compliant or conformable and can be the other side of the conductive coupling. Experimentation has shown that two-sided couplings where both sides of the coupling are compliant or conformable to at least some degree perform optimally.

The conductive couplings and brushes described herein are different than brushes used for motor commutation. Motor brushes are capable of delivering high currents at high voltages to a motor coil, but the connections established by motor brushes are too intermittent to be acceptable in active injury mitigation implementations. The brushes described herein provide a generally continuous connection or contact at low impedance from a lower impedance source without having to carry a lot of energy through the connection. In other words, the connection or contact between the brush and the conductive packing is at sufficiently low impedance and resistance for the relevant signal to not be materially perturbed by natural variations resulting from the moving parts in the connection.

INDUSTRIAL APPLICABILITY

The conductive couplings described herein are applicable to power tools equipped with active injury mitigation technology. Conductive couplings are particularly relevant to table saws, hand-held circular saws, track saws, miter saws, and band saws with active injury mitigation technology.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A power tool comprising:
a rotatable arbor;
a blade mounted on the arbor;
a motor to spin the arbor and blade, where the motor has a motor shaft;
a detection system to detect when a person contacts the spinning blade;
a reaction system triggerable to perform an action to mitigate injury upon detection of the contact;
a first conductive coupling establishing an electrical connection between the detection system and the blade; and
a second conductive coupling establishing an electrical connection between the motor shaft and an electrical ground.

2. The power tool of claim 1, where the first and second conductive couplings each includes a brush that is compliant.

3. The power tool of claim 2, where each brush comprises a solid piece supported by a spring.

4. The power tool of claim 1, where the first conductive coupling establishes the electrical connection with the arbor.

5. The power tool of claim 4, further comprising a conductive packing associated with the arbor, where the first conductive coupling includes a brush, and where the first conductive coupling establishes the electrical connection with the arbor by the brush contacting the conductive packing.

6. The power tool of claim 5, where the conductive packing is braided graphite.

7. The power tool of claim 1, where the first conductive coupling establishes the electrical connection through axial contact with the arbor.

8. A power tool comprising:
a rotatable arbor;
a blade mounted on the arbor;
a motor to spin the arbor and blade, where the motor has a motor shaft;
a detection system to detect when a person contacts the spinning blade;
a reaction system triggerable to perform an action to mitigate injury upon detection of the contact;
a first conductive coupling establishing an electrical connection between the detection system and the blade; and
a second conductive coupling establishing an electrical connection between the motor shaft and an electrical ground, where the second conductive coupling establishes the electrical connection through axial contact with the motor shaft.

* * * * *